US011796246B2

(12) United States Patent
Jung et al.

(10) Patent No.: US 11,796,246 B2
(45) Date of Patent: *Oct. 24, 2023

(54) VACUUM ADIABATIC BODY, FABRICATION METHOD FOR THE VACUUM ADIABATIC BODY, POROUS SUBSTANCE PACKAGE, AND REFRIGERATOR

(71) Applicant: LG ELECTRONICS INC., Seoul (KR)

(72) Inventors: Wonyeong Jung, Seoul (KR); Deokhyun Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 164 days.

This patent is subject to a terminal disclaimer.

(21) Appl. No.: 16/953,846

(22) Filed: Nov. 20, 2020

(65) Prior Publication Data

US 2021/0071941 A1    Mar. 11, 2021

Related U.S. Application Data

(63) Continuation of application No. 15/749,179, filed as application No. PCT/KR2016/008470 on Aug. 1, 2016, now Pat. No. 10,876,786.

(30) Foreign Application Priority Data

Aug. 3, 2015 (KR) .......................... 10-2015-0109726

(51) Int. Cl.
*F25D 23/02* (2006.01)
*F25D 23/06* (2006.01)
(Continued)

(52) U.S. Cl.
CPC ............ *F25D 23/064* (2013.01); *B29C 65/02* (2013.01); *B29C 65/7897* (2013.01);
(Continued)

(58) Field of Classification Search
CPC . B29C 66/00145; B29C 65/02; F25D 19/006; F25D 2201/14; F25D 23/062;
(Continued)

(56) References Cited

U.S. PATENT DOCUMENTS 1,413,169 A    4/1922  Lawton
1,588,707 A    6/1926  Csiga
(Continued)

FOREIGN PATENT DOCUMENTS

CN      1132346     10/1996
CN      1191959      9/1998
(Continued)

OTHER PUBLICATIONS

International Search Report and Written Opinion dated Oct. 12, 2016 issued in Application No. PCT/KR2016/008465.
(Continued)

*Primary Examiner* — Filip Zec
(74) *Attorney, Agent, or Firm* — KED & Associates LLP

(57) ABSTRACT

A vacuum adiabatic body, a method for fabricating a vacuum adiabatic body, a porous substance package, and a refrigerator including a vacuum adiabatic body and a porous substance package are provided. The vacuum adiabatic body may include a first plate, a second plate, a seal, a support, a heat resistance device, and an exhaust port. The support may include a porous substance and a film made of a resin material, the film configured to accommodate the porous substance therein. Accordingly, it may be possible to provide a vacuum adiabatic body through an inexpensive process.

20 Claims, 11 Drawing Sheets

(51) Int. Cl.

| | | |
|---|---|---|
| *B29C 65/02* | (2006.01) | |
| *B29C 65/78* | (2006.01) | |
| *B29C 65/00* | (2006.01) | |
| *F16L 59/02* | (2006.01) | |
| *F16L 59/065* | (2006.01) | |
| *F25D 19/00* | (2006.01) | |
| *B29K 709/08* | (2006.01) | |
| *B29L 31/00* | (2006.01) | |

(52) U.S. Cl.
CPC ...... *B29C 66/004* (2013.01); *B29C 66/00145* (2013.01); *B29C 66/72* (2013.01); *F16L 59/02* (2013.01); *F16L 59/065* (2013.01); *F25D 19/006* (2013.01); *F25D 23/02* (2013.01); *F25D 23/062* (2013.01); *B29K 2023/06* (2013.01); *B29K 2709/08* (2013.01); *B29K 2715/003* (2013.01); *B29K 2995/0097* (2013.01); *B29L 2031/7622* (2013.01); *F25D 2201/122* (2013.01); *F25D 2201/14* (2013.01)

(58) Field of Classification Search
CPC .. F25D 23/064; F25D 2201/122; F25D 23/02; F25D 23/028; F25D 23/063; F25D 23/082
See application file for complete search history.

(56) References Cited

U.S. PATENT DOCUMENTS

| | | | |
|---|---|---|---|
| 1,845,353 | A | 2/1932 | Snell |
| 2,000,882 | A | 5/1935 | Comstock |
| 2,708,774 | A | 5/1955 | Seelen |
| 2,715,976 | A | 8/1955 | Whitmore |
| 2,729,863 | A | 1/1956 | Kurtz |
| 2,768,046 | A | 10/1956 | Evans |
| 2,786,241 | A | 3/1957 | Garvey et al. |
| 3,091,946 | A | 6/1963 | Kesling |
| 3,161,265 | A | 12/1964 | Matsch et al. |
| 3,289,423 | A | 12/1966 | Berner et al. |
| 3,370,740 | A | 2/1968 | Anderson |
| 4,056,211 | A | 11/1977 | Zumwalt |
| 4,646,934 | A | 3/1987 | McAllister |
| 4,822,117 | A | 4/1989 | Boston, Jr. |
| 4,959,111 | A | 9/1990 | Kruck et al. |
| 5,011,729 | A | 4/1991 | McAllister |
| 5,018,328 | A | 5/1991 | Cur |
| 5,033,803 | A | 7/1991 | Katsuyoshi et al. |
| 5,185,981 | A | 2/1993 | Martinez |
| 5,200,015 | A | 4/1993 | Schilf |
| 5,361,598 | A | 11/1994 | Roseen |
| 5,512,345 | A | 4/1996 | Tsutsumi et al. |
| 5,532,034 | A | 7/1996 | Kirby et al. |
| 5,694,789 | A | 12/1997 | Do |
| 5,795,639 | A | 8/1998 | Lin |
| 5,843,353 | A | 12/1998 | De Vos et al. |
| 5,947,479 | A | 9/1999 | Ostrowski |
| 6,001,890 | A | 12/1999 | Hamilton |
| 6,029,846 | A | 2/2000 | Hirath et al. |
| 6,038,830 | A | 3/2000 | Hirath et al. |
| 6,109,712 | A | 8/2000 | Haworth et al. |
| 6,168,040 | B1 | 1/2001 | Sautner et al. |
| 6,192,703 | B1 | 2/2001 | Salyer et al. |
| 6,244,458 | B1 | 6/2001 | Frysinger et al. |
| 6,338,536 | B1 | 1/2002 | Ueno et al. |
| 6,485,122 | B2 | 11/2002 | Wolf |
| 8,383,225 | B2 | 2/2013 | Rotter |
| 8,857,931 | B2 | 10/2014 | Jung et al. |
| 8,881,398 | B2 | 11/2014 | Hanley et al. |
| 8,943,770 | B2 | 2/2015 | Sanders |
| 8,944,541 | B2 | 2/2015 | Allard et al. |
| 9,182,158 | B2 | 11/2015 | Wu |
| 9,328,951 | B2* | 5/2016 | Shin ..................... F25D 25/025 |
| 9,441,779 | B1 | 9/2016 | Alshourbagy et al. |
| 9,463,918 | B2 | 10/2016 | Reid |
| 9,752,818 | B2 | 9/2017 | Naik |
| 9,791,204 | B2* | 10/2017 | Kim ........................ F25D 23/02 |
| 9,945,600 | B2 | 4/2018 | Kang |
| 10,082,328 | B2 | 9/2018 | Jung et al. |
| 2002/0041134 | A1 | 4/2002 | Wolf et al. |
| 2002/0100250 | A1 | 8/2002 | Hirath et al. |
| 2002/0170265 | A1 | 11/2002 | Tokonabe et al. |
| 2003/0080126 | A1 | 5/2003 | Voute et al. |
| 2003/0115838 | A1 | 6/2003 | Rouanet et al. |
| 2004/0051427 | A1 | 3/2004 | Cittadini et al. |
| 2004/0091688 | A1 | 5/2004 | Gaku |
| 2004/0226956 | A1 | 11/2004 | Brooks |
| 2005/0175809 | A1 | 8/2005 | Hirai et al. |
| 2005/0235682 | A1 | 10/2005 | Hirai et al. |
| 2007/0152551 | A1 | 7/2007 | Kim et al. |
| 2007/0204648 | A1 | 9/2007 | Smale et al. |
| 2007/0243358 | A1 | 10/2007 | Gandini |
| 2008/0110128 | A1 | 5/2008 | Hirath |
| 2008/0289898 | A1 | 11/2008 | Rickards |
| 2009/0031659 | A1 | 2/2009 | Kalfon |
| 2009/0113899 | A1 | 5/2009 | Dain et al. |
| 2010/0104923 | A1 | 4/2010 | Takeguchi et al. |
| 2010/0178439 | A1 | 7/2010 | Bettger et al. |
| 2011/0089802 | A1 | 4/2011 | Cording |
| 2011/0146333 | A1 | 6/2011 | Koo et al. |
| 2011/0296797 | A1 | 12/2011 | Stark et al. |
| 2012/0103006 | A1 | 5/2012 | Jung et al. |
| 2012/0104923 | A1 | 5/2012 | Jung et al. |
| 2012/0118002 | A1 | 5/2012 | Kim et al. |
| 2012/0125039 | A1 | 5/2012 | Hwang |
| 2012/0128920 | A1 | 5/2012 | Yoon et al. |
| 2012/0231204 | A1 | 9/2012 | Jeon et al. |
| 2012/0269996 | A1 | 10/2012 | Jäger |
| 2012/0326587 | A1 | 12/2012 | Jeong et al. |
| 2013/0008309 | A1* | 1/2013 | Hashida ............. B01D 53/0407 |
| | | | 95/90 |
| 2013/0026900 | A1 | 1/2013 | Oh et al. |
| 2013/0099650 | A1 | 4/2013 | Lee et al. |
| 2013/0105494 | A1 | 5/2013 | Jung |
| 2013/0105496 | A1 | 5/2013 | Jung |
| 2013/0195544 | A1 | 8/2013 | Sanders et al. |
| 2013/0255304 | A1 | 10/2013 | Cur et al. |
| 2013/0257257 | A1 | 10/2013 | Cur |
| 2013/0293080 | A1 | 11/2013 | Kim |
| 2014/0103791 | A1 | 4/2014 | Cheon |
| 2014/0132142 | A1 | 5/2014 | Kim et al. |
| 2014/0216100 | A1 | 8/2014 | Toshimitsu et al. |
| 2014/0272208 | A1 | 9/2014 | Song et al. |
| 2014/0315011 | A1 | 10/2014 | Lee et al. |
| 2014/0346942 | A1 | 11/2014 | Kim et al. |
| 2015/0030800 | A1 | 1/2015 | Jung et al. |
| 2015/0068401 | A1 | 3/2015 | Hashida |
| 2015/0192356 | A1 | 7/2015 | Kang et al. |
| 2016/0109172 | A1 | 4/2016 | Kim et al. |
| 2016/0356542 | A1 | 12/2016 | Kim et al. |
| 2017/0325634 | A1 | 11/2017 | Cai et al. |
| 2018/0266620 | A1 | 9/2018 | Kawarazaki et al. |
| 2018/0299060 | A1 | 10/2018 | Song et al. |
| 2018/0313492 | A1 | 11/2018 | Kitano et al. |
| 2019/0101320 | A1 | 4/2019 | Dherde et al. |
| 2019/0128593 | A1 | 5/2019 | Deka et al. |

FOREIGN PATENT DOCUMENTS

| | | |
|---|---|---|
| CN | 1276052 | 12/2000 |
| CN | 1286386 | 3/2001 |
| CN | 1515857 | 7/2004 |
| CN | 1576678 | 2/2005 |
| CN | 2700790 | 5/2005 |
| CN | 1666071 | 9/2005 |
| CN | 2748848 | 12/2005 |
| CN | 1731053 | 2/2006 |
| CN | 1820173 | 8/2006 |
| CN | 1896657 | 1/2007 |
| CN | 101072968 | 11/2007 |
| CN | 101171472 | 4/2008 |
| CN | 101349493 A | 1/2009 |
| CN | 201191121 | 2/2009 |

(56) References Cited

FOREIGN PATENT DOCUMENTS

| | | |
|---|---|---|
| CN | 201428906 | 3/2010 |
| CN | 201764779 | 3/2011 |
| CN | 102032736 | 4/2011 |
| CN | 201811526 | 4/2011 |
| CN | 102099646 | 6/2011 |
| CN | 102116402 | 7/2011 |
| CN | 102261470 | 11/2011 |
| CN | 102455103 | 5/2012 |
| CN | 102455104 | 5/2012 |
| CN | 102455105 | 5/2012 |
| CN | 102735013 | 10/2012 |
| CN | 102818421 | 12/2012 |
| CN | 102840729 | 12/2012 |
| CN | 102927740 | 2/2013 |
| CN | 103062981 | 4/2013 |
| CN | 10-2013-0054213 | 5/2013 |
| CN | 103090615 | 5/2013 |
| CN | 103090616 | 5/2013 |
| CN | 103154648 | 6/2013 |
| CN | 103189696 | 7/2013 |
| CN | 103228851 | 7/2013 |
| CN | 203095854 | 7/2013 |
| CN | 103363764 | 10/2013 |
| CN | 103370587 A | 10/2013 |
| CN | 103542660 | 1/2014 |
| CN | 103575038 | 2/2014 |
| CN | 103649658 | 3/2014 |
| CN | 103968196 | 8/2014 |
| CN | 104180595 | 12/2014 |
| CN | 104204646 | 12/2014 |
| CN | 104254749 | 12/2014 |
| CN | 104344653 | 2/2015 |
| CN | 104457117 A | 3/2015 |
| CN | 104482707 | 4/2015 |
| CN | 104567215 | 4/2015 |
| CN | 104634047 | 5/2015 |
| CN | 104729201 | 6/2015 |
| CN | 104746690 | 7/2015 |
| CN | 105546923 | 5/2016 |
| CN | 108354755 | 8/2018 |
| DE | 956 899 | 1/1957 |
| DE | 28 02 910 | 8/1978 |
| DE | 29 39 878 | 4/1981 |
| DE | 31 21 351 | 12/1982 |
| DE | 9204365 | 7/1992 |
| DE | 197 45 825 | 4/1999 |
| DE | 1 980 3908 | 8/1999 |
| DE | 299 12 917 | 11/1999 |
| DE | 199 07 182 | 8/2000 |
| DE | 10-2011-050473 | 11/2011 |
| DE | 10 2011 014 302 | 9/2012 |
| DE | 10 2011 079 209 | 1/2013 |
| DE | 10-2012-100490 | 7/2013 |
| DE | 10-2012-223539 | 6/2014 |
| EP | 0 071 090 | 2/1983 |
| EP | 0 658 716 | 6/1995 |
| EP | 0 658 733 | 6/1995 |
| EP | 0 892 120 | 1/1999 |
| EP | 1 477 752 | 11/2004 |
| EP | 1 484 563 | 12/2004 |
| EP | 1 614 954 | 1/2006 |
| EP | 2 333 179 | 6/2011 |
| EP | 2 447 639 | 5/2012 |
| EP | 2 806 239 | 11/2014 |
| EP | 2 824 405 | 1/2015 |
| EP | 2 829 827 | 1/2015 |
| EP | 2 936 013 | 10/2015 |
| EP | 2 952 839 | 12/2015 |
| EP | 2 789 951 | 10/2020 |
| GB | 890372 | 2/1962 |
| GB | 2 446 053 | 7/2008 |
| JP | H04-341694 | 11/1992 |
| JP | H05-10494 | 1/1993 |
| JP | H07-234067 | 9/1995 |
| JP | H09-145241 | 6/1997 |
| JP | 11-211334 | 8/1999 |
| JP | H11335114 | 12/1999 |
| JP | 2002-243091 A | 8/2002 |
| JP | 2003-106760 | 4/2003 |
| JP | 2003-269688 | 9/2003 |
| JP | 2004-044980 | 2/2004 |
| JP | 2004-196411 | 7/2004 |
| JP | 2005-214372 A | 8/2005 |
| JP | 2007-218509 | 8/2007 |
| JP | 2008-045580 | 2/2008 |
| JP | 2008-249003 | 10/2008 |
| JP | 2009-078261 A | 4/2009 |
| JP | 2010-008011 | 1/2010 |
| JP | 2010008011 A | 1/2010 |
| JP | 2012-087993 | 5/2012 |
| JP | 2012-255607 | 12/2012 |
| JP | 2013-119966 A | 6/2013 |
| JP | 2014-037931 | 2/2014 |
| KR | 10-2001-0073363 | 8/2001 |
| KR | 10-0343719 | 7/2002 |
| KR | 10-0411841 | 12/2003 |
| KR | 10-2005-0065088 | 6/2005 |
| KR | 20070052156 A | 5/2007 |
| KR | 10-2009-0111632 | 10/2009 |
| KR | 10-2010-0097410 | 9/2010 |
| KR | 10-2010-0099629 | 9/2010 |
| KR | 10-2010-0119937 | 11/2010 |
| KR | 10-2010-0136614 | 12/2010 |
| KR | 10-2011-0015322 | 2/2011 |
| KR | 10-2011-0015327 | 2/2011 |
| KR | 10-1041086 | 6/2011 |
| KR | 10-2011-0100440 | 9/2011 |
| KR | 10-2012-0044558 A | 5/2012 |
| KR | 10-2012-0139648 | 12/2012 |
| KR | 10-1227516 | 1/2013 |
| KR | 10-2013-0048528 | 5/2013 |
| KR | 10-2013-0048530 A | 5/2013 |
| KR | 10-2014-0129552 | 11/2014 |
| KR | 10-2015-0012712 | 2/2015 |
| KR | 10-1506413 | 3/2015 |
| NL | 1005962 | 11/1998 |
| RU | 129188 | 6/2013 |
| WO | WO 93/25843 | 12/1993 |
| WO | WO 2006/003199 | 1/2006 |
| WO | WO 2012/084874 | 6/2012 |
| WO | WO 2012/176880 | 12/2012 |
| WO | WO 2013/007568 | 1/2013 |
| WO | WO-2013007568 A2 * | 1/2013 ............ F16L 59/065 |
| WO | WO 2014/049969 | 4/2014 |
| WO | WO 2014/175639 | 10/2014 |
| WO | WO 2016/208193 A1 | 12/2016 |
| WO | WO 2017/023095 | 2/2017 |
| WO | WO 2017/192121 | 11/2017 |
| WO | WO 2018/044274 | 3/2018 |

OTHER PUBLICATIONS

International Search Report and Written Opinion dated Oct. 12, 2016 issued in Application No. PCT/KR2016/008507.
International Search Report and Written Opinion dated Nov. 21, 2016 issued in Application No. PCT/KR2016/008466.
International Search Report and Written Opinion dated Nov. 21, 2016 issued in Application No. PCT/KR2016/008468.
International Search Report and Written Opinion dated Nov. 21, 2016 issued in Application No. PCT/KR2016/008469.
International Search Report and Written Opinion dated Nov. 21, 2016 issued in Application No. PCT/KR2016/008470.
International Search Report and Written Opinion dated Nov. 21, 2016 issued in Application No. PCT/KR2016/008501.
International Search Report and Written Opinion dated Nov. 21, 2016 issued in Application No. PCT/KR2016/008502.
International Search Report and Written Opinion dated Nov. 21, 2016 issued in Application No. PCT/KR2016/008505.
International Search Report and Written Opinion dated Nov. 21, 2016 issued in Application No. PCT/KR2016/008519.
International Search Report and Written Opinion dated Nov. 21, 2016 issued in Application No. PCT/KR2016/008523.

(56) References Cited

OTHER PUBLICATIONS

International Search Report and Written Opinion dated Dec. 7, 2016 issued in Application No. PCT/KR2016/008516.
International Search Report and Written Opinion dated Dec. 23, 2016 issued in Application No. PCT/KR2016/008512.
International Search Report and Written Opinion dated Dec. 23, 2016 issued in Application No. PCT/KR2016/008514.
Russian Office Action dated Sep. 25, 2018 issued in RU Application No. 2018107646.
European Search Report dated Dec. 21, 2018 issued in EP Application No. 16833330.0.
European Search Report dated Feb. 13, 2019 issued in EP Application No. 16833309.4.
European Search Report dated Feb. 13, 2019 issued in EP Application No. 16833311.0.
European Search Report dated Feb. 20, 2019 issued in EP Application No. 16833313.6.
European Search Report dated Feb. 22, 2019 issued in EP Application No. 16833312.8.
European Search Report dated Feb. 26, 2019 issued in EP Application No. 16833324.3.
European Search Report dated Feb. 26, 2019 issued in EP Application No. 16833336.7.
European Search Report dated Mar. 1, 2019 issued in EP Application No. 16833323.5.
European Search Report dated Mar. 1, 2019 issued in EP Application No. 16833338.3.
European Search Report dated Mar. 13, 2019 issued in EP Application No. 16833331.8.
European Search Report dated Mar. 15, 2019 issued in EP Application No. 16833326.8.
European Search Report dated Apr. 3, 2019 issued in EP Application No. 16833325.0.
U.S. Office Action dated Jun. 13, 2019 issued in related U.S. Appl. No. 15/749,139.
U.S. Office Action dated Jun. 13, 2019 issued in related U.S. Appl. No. 15/749,142.
U.S. Office Action dated Jun. 13, 2019 issued in related U.S. Appl. No. 15/749,136.
U.S. Office Action dated Sep. 20, 2019 issued in U.S. Appl. No. 15/749,149.
U.S. Office Action dated Oct. 4, 2019 issued in related U.S. Appl. No. 15/749,140.
Chinese Office Action (with English translation) dated Jul. 15, 2019 issued in CN Application No. 201680045949.0.
Chinese Office Action (with English translation) dated Aug. 5, 2019 issued in CN Application No. 201680045869.5.
Chinese Office Action (with English translation) dated Aug. 5, 2019 issued in CN Application No. 201680045899.6.
Chinese Office Action (with English translation) dated Aug. 5, 2019 issued in CN Application No. 201680045908.1.
Chinese Office Action (with English translation) dated Aug. 5, 2019 issued in CN Application No. 201680045935.9.
Chinese Office Action (with English translation) dated Aug. 5, 2019 issued in CN Application No. 201680046042.6.
Chinese Office Action (with English translation) dated Aug. 5, 2019 issued in CN Application No. 201680046048.3.
Chinese Office Action (with English translation) dated Aug. 13, 2019 issued in CN Application No. 201680045950.3.
Chinese Office Action (with English translation) dated Sep. 19, 2019 issued in CN Application No. 201680045897.7.
Chinese Office Action (with English translation) dated Sep. 19, 2019 issued in CN Application No. 201680045898.1.
Chinese Office Action (with English translation) dated Sep. 19, 2019 issued in CN Application No. 201680046047.9.
U.S. Office Action dated Oct. 17, 2019 issued in U.S. Appl. No. 15/749,143.
U.S. Office Action dated Oct. 17, 2019 issued in U.S. Appl. No. 15/749,162.
U.S. Office Action dated Oct. 17, 2019 issued in U.S. Appl. No. 15/749,147.
U.S. Office Action dated Dec. 10, 2019 issued in U.S. Appl. No. 15/749,132.
U.S. Office Action dated Feb. 18, 2020 issued in co-pending related U.S. Appl. No. 15/749,146.
U.S. Office Action dated Mar. 20, 2020 issued in co-pending related U.S. Appl. No. 15/749,162.
U.S. Office Action dated Mar. 24, 2020 issued in co-pending related U.S. Appl. No. 15/749,154.
U.S. Office Action dated May 25, 2020 issued in co-pending related U.S. Appl. No. 15/749,156.
U.S. Office Action dated Mar. 27, 2020 issued in co-pending related U.S. Appl. No. 15/749,149.
U.S. Office Action dated Apr. 15, 2020 issued in co-pending related U.S. Appl. No. 15/749,136.
U.S. Notice of Allowance dated Apr. 15, 2020 issued in co-pending related U.S. Appl. No. 15/749,140.
Korean Office Action dated Jun. 5, 2020 issued in Application 10-2017-0093784.
Extended European Search Report dated Jul. 10, 2020 issued in Application 20168389.3.
U.S. Office Action dated Sep. 1, 2020 issued in U.S. Appl. No. 15/749,156.
U.S. Appl. No. 17/411,659, filed Aug. 25, 2021.
U.S. Appl. No. 17/114,950, filed Dec. 8, 2020.
U.S. Appl. No. 17/170,005, filed Feb. 8, 2021.
U.S. Appl. No. 16/942,213, filed Jul. 29, 2020.
U.S. Appl. No. 16/942,262, filed Jul. 29, 2020.
U.S. Appl. No. 15/749,156, filed Jan. 31, 2018.
U.S. Appl. No. 17/582,596, filed Jan. 24, 2022.
U.S. Appl. No. 17/030,806, filed Sep. 24, 2020.
U.S. Appl. No. 16/929,523, filed Jul. 15, 2020.
U.S. Appl. No. 16/710,720, filed Dec. 11, 2019.
U.S. Appl. No. 17/021,582, filed Sep. 15, 2020.
U.S. Appl. No. 17/072,231, filed Oct. 16, 2020.
U.S. Appl. No. 16/953,846, filed Nov. 20, 2020.
U.S. Appl. No. 17/155,430, filed Jan. 22, 2021.
U.S. Appl. No. 17/134,911, filed Dec. 28, 2020.
United States Office Action dated Oct. 5, 2021 issued in co-pending related U.S. Appl. No. 16/942,262.
United States Office Action dated Oct. 19, 2021 issued in co-pending related U.S. Appl. No. 17/021,582.
United States Office Action dated Oct. 26, 2021 issued in co-pending related U.S. Appl. No. 16/942,213.
Korean Notice of Allowance dated Jun. 1, 2022 issued in KR Application No. 10-2021-0085731.
Chinese Office Action dated Jun. 24, 2021 issued in CN Application No. 202010669926.5.
Chinese Office Action dated Dec. 3, 2021 issued in CN Application No. 202110032077.7.
European Search Report dated Feb. 8, 2022 issued in EP Application No. 21203498.7.
Chinese Office Action dated Feb. 15, 2022 issued in CN Application No. 202010671000.X.
Chinese Office Action dated Feb. 18, 2022 issued in CN Application No. 202010975466.9.
European Search Report dated Oct. 11, 2021 issued in EP Application No. 21185349.4.
European Search Report dated Oct. 11, 2021 issued in EP Application No. 21185362.7.
U.S. Appl. No. 15/749,132, filed Jan. 31, 2018.
United States Office Action dated Jul. 7, 2022 issued in co-pending related U.S. Appl. No. 16/710,720.
United States Office Action dated Jul. 13, 2022 issued in co-pending related U.S. Appl. No. 17/134,911.
United States Office Action dated Jul. 26, 2022 issued in co-pending related U.S. Appl. No. 17/030,806.
European Office Action dated Nov. 21, 2022 issued in EP Application No. 20168389.3.
United States Office Action dated Nov. 25, 2022 issued in co-pending related U.S. Appl. No. 17/411,659.

(56) References Cited

OTHER PUBLICATIONS

Chinese Office Action and Search Report dated Jul. 20, 2021 issued in Application 20101067100.X.
Korean Office Action dated Aug. 1, 2021 issued in KR Application No. 10-2021-0085731.
Chinese Office Action dated Aug. 2, 2021 issued in CN Application No. 202010972409.5.
Chinese Office Action dated Aug. 3, 2021 issued in CN Application No. 202010972419.9.
Chinese Office Action dated Aug. 4, 2021 issued in CN Application No. 202010972442.8.
United States Office Action dated Oct. 6, 2022 issued in co-pending related U.S. Appl. No. 17/072,231.
Chinese Office Action dated May 18, 2022 issued in CN Application No. 202110718315 .X.
United States Office Action dated Jun. 10, 2022 issued in co-pending related U.S. Appl. No. 16/942,213.
United States Office Action dated Mar. 31, 2022 issued in co-pending related U.S. Appl. No. 16/929,523.
Chinese Office Action dated Apr. 6, 2021 issued in CN Application No. 202010248772.2.
Chinese Office Action dated Apr. 6, 2021 issued in CN Application No. 202010248789.8.
Chinese Office Action dated Apr. 6, 2021 issued in CN Application No. 202010248791.5.
Chinese Office Action dated Apr. 8, 2021 issued in CN Application No. 202010248891.8.
Chinese Office Action dated Jun. 2, 2021 issued in CN Application No. 202010634146.7.
Chinese Office Action dated Jun. 23, 2021 issued in CN Application No. 202010669915.7.
United States Office Action dated Jun. 28, 2021 issued in co-pending related U.S. Appl. No. 15/749,156.
United States Office Action dated Mar. 2, 2022 issued in co-pending related U.S. Appl. No. 17/170,005.
U.S. Appl. No. 17/939,507, filed Sep. 7, 2022.
U.S. Appl. No. 17/749,679, filed May 20, 2022.
European Office Action dated Jan. 11, 2021 issued in Application 16 833 313.6.
U.S. Office Action dated Mar. 31, 2021 issued in co-pending U.S. Appl. No. 15/749,132.
European Search Report dated Nov. 3, 2022 issued in EP Application No. 22151005.0.
Chinese Notice of Allowance dated Jun. 1, 2022 issued in CN Application No. 202110032072.4.
Korean Office Action dated Aug. 8, 2022 issued in KR Application No. 10-2015-0109622.
United States Office Action dated Jan. 18, 2023 issued in co-pending related U.S. Appl. No. 16/942,213.
U.S. Office Action dated Apr. 27, 2023 issued in U.S. Appl. No. 17/072,231.
U.S. Appl. No. 17/411,659, dated Aug. 25, 2021.
U.S. Appl. No. 18/091,203, dated Dec. 29, 2022.
U.S. Appl. No. 17/170,005, dated Feb. 8, 2021.
U.S. Appl. No. 17/939,507, dated Sep. 7, 2022.
U.S. Appl. No. 16/942,213, dated Jul. 29, 2020.
U.S. Appl. No. 18/095,658, dated May 20, 2022.
U.S. Appl. No. 17/582,596, dated Jan. 24, 2022.
U.S. Appl. No. 17/030,806, dated Sep. 24, 2020.
U.S. Appl. No. 18/095,658, dated Jan. 11, 2023.
U.S. Appl. No. 16/710,720, dated Dec. 11, 2019.
U.S. Appl. No. 17/980,088, dated Nov. 3, 2022.
U.S. Appl. No. 17/072,231, dated Oct. 16, 2020.
U.S. Appl. No. 16/953,846, dated Nov. 20, 2020.
U.S. Appl. No. 17/155,430, dated Jan. 22, 2021.
U.S. Appl. No. 18/091,040, dated Dec. 29, 2022.
U.S. Office Action dated Mar. 20, 2023 issued in co-pending related U.S. Appl. No. 17/030,806.
Machine translation of EP 2 952 839.
Korean Office Action dated Jul. 31, 2023 issued in Application 10-2023-0020717.
Chinese Office Action dated Aug. 30, 2023 issued in Application No. 202110718284.8 and English translation.

\* cited by examiner (a)

(b)

(c)

VACUUM ADIABATIC BODY, FABRICATION METHOD FOR THE VACUUM ADIABATIC BODY, POROUS SUBSTANCE PACKAGE, AND REFRIGERATOR

CROSS-REFERENCE TO RELATED APPLICATIONS

This application is a Continuation Application of U.S. National Stage application Ser. No. 15/749,179 filed Jan. 31, 2018 under 35 U.S.C. § 371 of PCT Application No. PCT/KR2016/008470, filed Aug. 1, 2016, which claims priority to Korean Patent Application No. 10-2015-0109726, filed Aug. 3, 2015, whose entire disclosures are hereby incorporated by reference.

BACKGROUND

1. Field

The present disclosure relates to a vacuum adiabatic body, a fabrication method for the vacuum adiabatic body, a porous substance package, and a refrigerator.

2. Background

A vacuum adiabatic body is a product for suppressing heat transfer by vacuuming the interior of a body thereof. The vacuum adiabatic body can reduce heat transfer by convection and conduction, and hence is applied to heating apparatuses and refrigerating apparatuses. In a typical adiabatic method applied to a refrigerator, although it is differently applied in refrigeration and freezing, a foam urethane adiabatic wall having a thickness of about 30 cm or more is generally provided. However, the internal volume of the refrigerator is therefore reduced.

In order to increase the internal volume of a refrigerator, there is an attempt to apply a vacuum adiabatic body to the refrigerator.

First, Korean Patent No. 10-0343719 (Reference Document 1) of the present applicant has been disclosed. According to Reference Document 1, there is disclosed a method in which a vacuum adiabatic panel is prepared and then built in walls of a refrigerator, and the exterior of the vacuum adiabatic panel is finished with a separate molding such as Styrofoam (polystyrene). According to the method, additional foaming is not required, and the adiabatic performance of the refrigerator is improved. However, fabrication cost is increased, and a fabrication method is complicated. As another example, a technique of providing walls using a vacuum adiabatic material and additionally providing adiabatic walls using a foam filling material has been disclosed in Korean Patent Publication No. 10-2015-0012712 (Reference Document 2). According to Reference Document 2, fabrication cost is increased, and a fabrication method is complicated.

As another example, there is an attempt to fabricate all walls of a refrigerator using a vacuum adiabatic body that is a single product. For example, a technique of providing an adiabatic structure of a refrigerator to be in a vacuum state has been disclosed in U.S. Patent Laid-Open Publication No. US 2004/0226956 A1 (Reference Document 3).

BRIEF DESCRIPTION OF THE DRAWINGS

The embodiments will be described in detail with reference to the following drawings in which like reference numerals refer to like elements wherein.

DETAILED DESCRIPTION

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the disclosure may be practiced. These embodiments are described in sufficient detail to enable those skilled in the art to practice the disclosure, and it is understood that other embodiments may be utilized and that logical structural, mechanical, electrical, and chemical changes may be made without departing from the spirit or scope of the disclosure. To avoid detail not necessary to enable those skilled in the art to practice the disclosure, the description may omit certain information known to those skilled in the art. The following detailed description is, therefore, not to be taken in a limiting sense.

In the following description, the term 'vacuum pressure' means a certain pressure state lower than atmospheric pressure. In addition, the expression that a vacuum degree of A is higher than that of B means that a vacuum pressure of A is lower than that of B.

Figure 1:
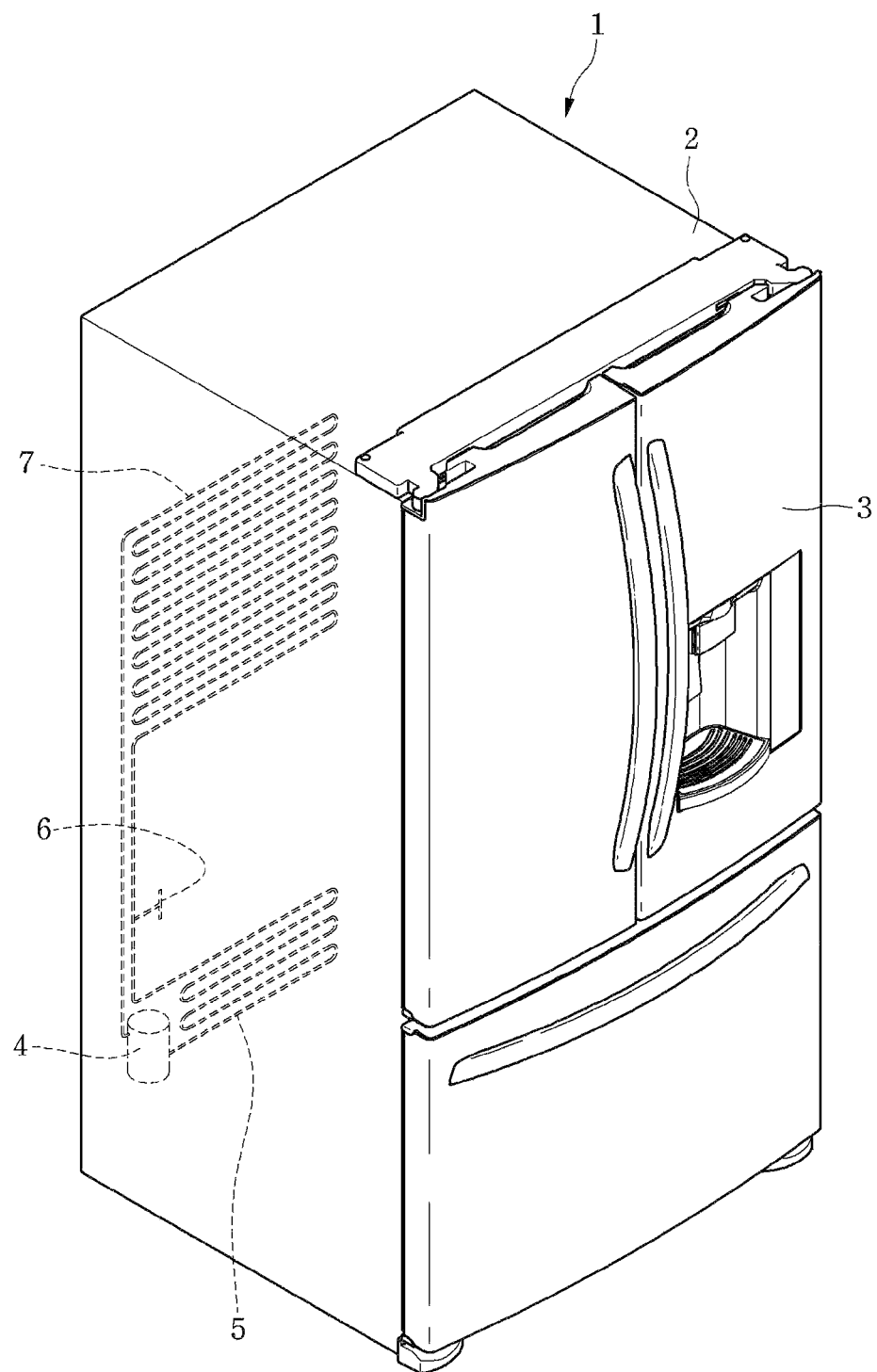
FIG. 1 is a perspective view of a refrigerator according to an embodiment.

FIG. 1 is a perspective view of a refrigerator according to an embodiment.

Referring to FIG. 1, the refrigerator 1 includes a main body 2 provided with a cavity 9 capable of storing storage goods and a door 3 provided to open/close the main body 2. The door 3 may be rotatably or movably disposed to open/close the cavity 9. The cavity 9 may provide at least one of a refrigerating chamber and a freezing chamber.

Parts constituting a freezing cycle in which cold air is supplied into the cavity 9 may be included. Specifically, the parts include a compressor 4 for compressing a refrigerant, a condenser 5 for condensing the compressed refrigerant, an expander 6 for expanding the condensed refrigerant, and an evaporator 7 for evaporating the expanded refrigerant to take heat. As a typical structure, a fan may be installed at a position adjacent to the evaporator 7, and a fluid blown from the fan may pass through the evaporator 7 and then be blown into the cavity 9. A freezing load is controlled by adjusting the blowing amount and blowing direction by the fan, adjusting the amount of a circulated refrigerant, or adjusting the compression rate of the compressor, so that it is possible to control a refrigerating space or a freezing space.

Figure 2:
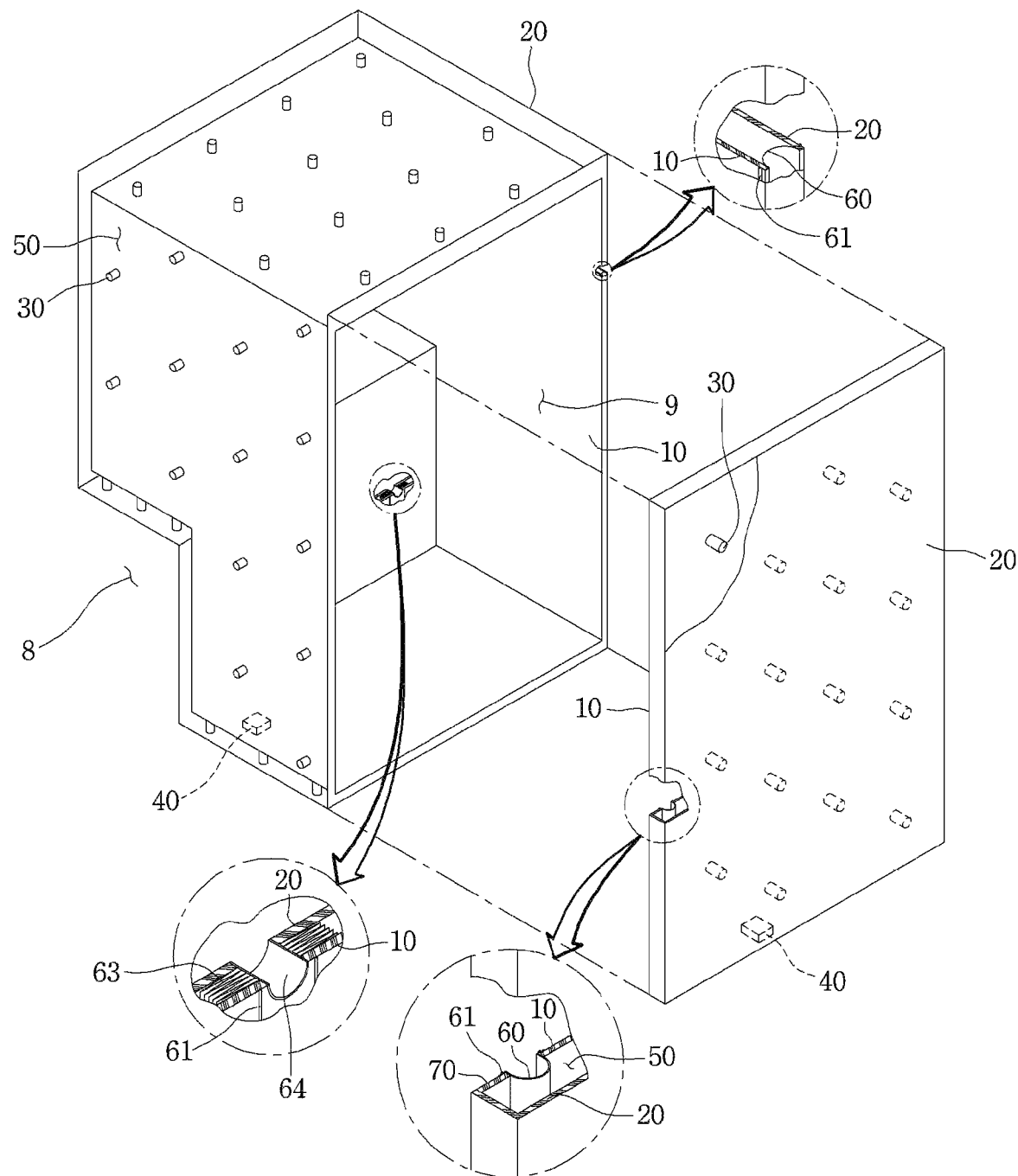
FIG. 2 is a view schematically showing a vacuum adiabatic body used in a main body and a door of the refrigerator.

FIG. 2 is a view schematically showing a vacuum adiabatic body used in the main body and the door of the refrigerator. In FIG. 2, a main body-side vacuum adiabatic body is illustrated in a state in which top and side walls are removed, and a door-side vacuum adiabatic body is illustrated in a state in which a portion of a front wall is removed. In addition, sections of portions at conductive resistance sheets are schematically illustrated for convenience of understanding.

Referring to FIG. 2, the vacuum adiabatic body includes a first plate member or first plate 10 for providing a wall of a low-temperature space, a second plate member or second plate 20 for providing a wall of a high-temperature space, a vacuum space part or vacuum space 50 defined as a gap part or gap between the first and second plate members 10 and 20. Also, the vacuum adiabatic body includes the conductive resistance sheets 60 and 63 for preventing heat conduction between the first and second plate members 10 and 20. A sealing part or seal 61 for sealing the first and second plate members 10 and 20 is provided such that the vacuum space part 50 is in a sealing or sealed state. When the vacuum adiabatic body is applied to a refrigerating or heating cabinet, the first plate member 10 may be referred to as an inner case, and the second plate member 20 may be referred to as an outer case. A machine chamber 8 in which parts providing a freezing cycle are accommodated is placed at a lower rear side of the main body-side vacuum adiabatic body, and an exhaust port 40 for forming a vacuum state by exhausting air in the vacuum space part 50 is provided at any one side of the vacuum adiabatic body. In addition, a pipeline 64 passing through the vacuum space part 50 may be further installed so as to install a defrosting water line and electric lines.

The first plate member 10 may define at least one portion of a wall for a first space provided thereto. The second plate member 20 may define at least one portion of a wall for a second space provided thereto. The first space and the second space may be defined as spaces having different temperatures. Here, the wall for each space may serve as not only a wall directly contacting the space but also a wall not contacting the space. For example, the vacuum adiabatic body of the embodiment may also be applied to a product further having a separate wall contacting each space.

Factors of heat transfer, which cause loss of the adiabatic effect of the vacuum adiabatic body, are heat conduction between the first and second plate members 10 and 20, heat radiation between the first and second plate members 10 and 20, and gas conduction of the vacuum space part 50.

Hereinafter, a heat resistance unit or device provided to reduce adiabatic loss related to the factors of the heat transfer will be provided. Meanwhile, the vacuum adiabatic body and the refrigerator of the embodiment do not exclude that another adiabatic means is further provided to at least one side of the vacuum adiabatic body. Therefore, an adiabatic means using foaming or the like may be further provided to another side of the vacuum adiabatic body.

Figure 3:
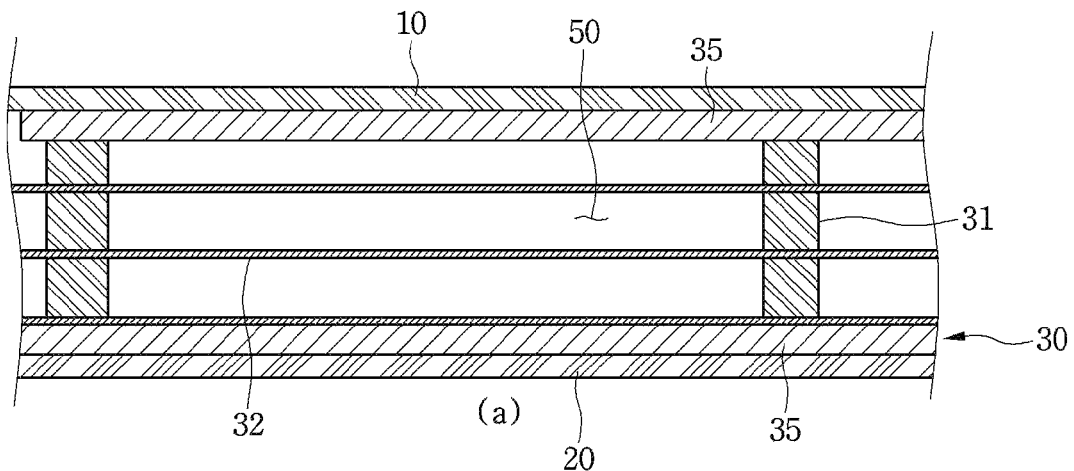
FIG. 3 is a view showing various embodiments of an internal configuration of a vacuum space part.
Figure 3:
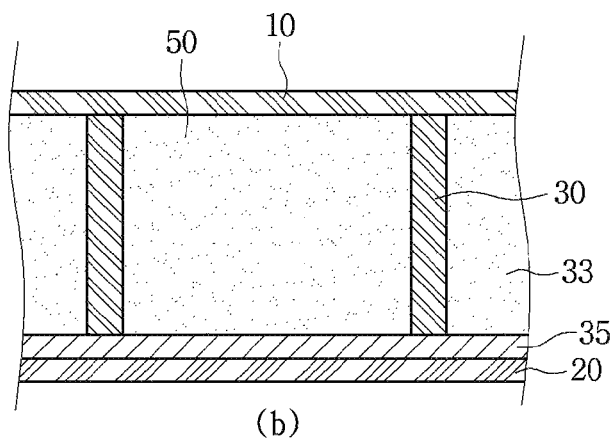
Figure 3:
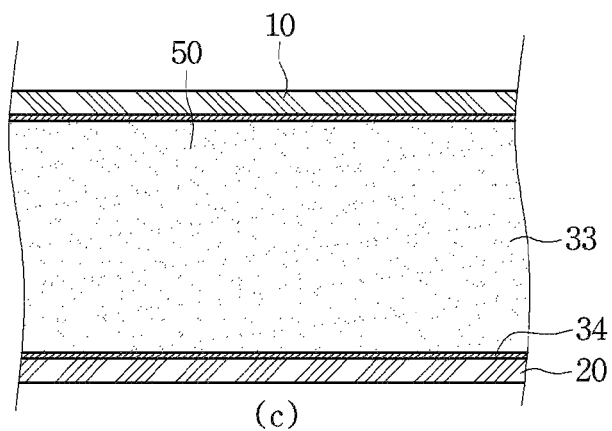

FIG. 3 is a view showing various embodiments of an internal configuration of the vacuum space part.

First, referring to FIG. 3a, the vacuum space part 50 is provided in a third space having a different pressure from the first and second spaces, preferably, a vacuum state, thereby reducing adiabatic loss. The third space may be provided at a temperature between the temperature of the first space and the temperature of the second space. Since the third space is provided as a space in the vacuum state, the first and second plate members 10 and 20 receive a force contracting in a direction in which they approach each other due to a force corresponding to a pressure difference between the first and second spaces. Therefore, the vacuum space part 50 may be deformed in a direction in which it is reduced. In this case, adiabatic loss may be caused due to an increase in amount of heat radiation, caused by the contraction of the vacuum space part 50, and an increase in amount of heat conduction, caused by contact between the plate members 10 and 20.

A supporting unit 30 may be provided to reduce the deformation of the vacuum space part 50. The supporting unit 30 includes bars 31. The bars 31 may extend in a direction substantially vertical to the first and second plate members 10 and 20 so as to support a distance between the first and second plate members 10 and 20. A support plate 35 may be additionally provided to at least one end of the bar 31. The support plate 35 connects at least two bars 31 to each other, and may extend in a direction horizontal to the first and second plate members 10 and 20. The support plate 35 may be provided in a plate shape, or may be provided in a lattice shape such that its area contacting the first or second plate member 10 or 20 is decreased, thereby reducing heat transfer. The bars 31 and the support plate 35 are fixed to each other at at least one portion, to be inserted together between the first and second plate members 10 and 20. The support plate 35 contacts at least one of the first and second plate members 10 and 20, thereby preventing deformation of the first and second plate members 10 and 20. In addition, based on the extending direction of the bars 31, a total sectional area of the support plate 35 is provided to be greater than that of the bars 31, so that heat transferred through the bars 31 can be diffused through the support plate 35.

A material of the supporting unit 30 may include a resin selected from the group consisting of PC, glass fiber PC, low outgassing PC, PPS, and LCP so as to obtain high compressive strength, low outgassing and water absorptance, low thermal conductivity, high compressive strength at high temperature, and excellent machinability.

A radiation resistance sheet 32 for reducing heat radiation between the first and second plate members 10 and 20 through the vacuum space part 50 will be described. The first and second plate members 10 and 20 may be made of a stainless material capable of preventing corrosion and providing a sufficient strength. The stainless material has a relatively high emissivity of 0.16, and hence a large amount of radiation heat may be transferred. In addition, the supporting unit 30 made of the resin has a lower emissivity than the plate members, and is not entirely provided to inner surfaces of the first and second plate members 10 and 20. Hence, the supporting unit 30 does not have great influence on radiation heat. Therefore, the radiation resistance sheet 32 may be provided in a plate shape over a majority of the area of the vacuum space part 50 so as to concentrate on reduction of radiation heat transferred between the first and second plate members 10 and 20. A product having a low emissivity may be preferably used as the material of the radiation resistance sheet 32. In an embodiment, an aluminum foil having an emissivity of 0.02 may be used as the radiation resistance sheet 32. Since the transfer of radiation heat cannot be sufficiently blocked using one radiation resistance sheet, at least two radiation resistance sheets 32 may be provided at a certain distance so as not to contact each other. In addition, at least one radiation resistance sheet may be provided in a state in which it contacts the inner surface of the first or second plate member 10 or 20.

Referring to FIG. 3b, the distance between the plate members is maintained by the supporting unit 30, and a porous substance 33 may be filled in the vacuum space part 50. The porous substance 33 may have a higher emissivity than the stainless material of the first and second plate members 10 and 20. However, since the porous substance 33 is filled in the vacuum space part 50, the porous substance 33 has a high efficiency for resisting the radiation heat transfer.

In this embodiment, the vacuum adiabatic body can be fabricated without using the radiation resistance sheet 32.

Referring to FIG. 3c, the supporting unit 30 maintaining the vacuum space part 50 is not provided. Instead of the supporting unit 30, the porous substance 33 is provided in a state in which it is surrounded by a film 34. In this case, the porous substance 33 may be provided in a state in which it is compressed so as to maintain the gap of the vacuum space part 50. The film 34 is made of, for example, a PE material, and may be provided in a state in which holes are formed therein.

In this embodiment, the vacuum adiabatic body can be fabricated without using the supporting unit 30. In other words, the porous substance 33 can simultaneously serve as the radiation resistance sheet 32 and the supporting unit 30.

A case where the porous substance 33 is filled in the vacuum space part 50 will be described in detail later.

Figure 4:
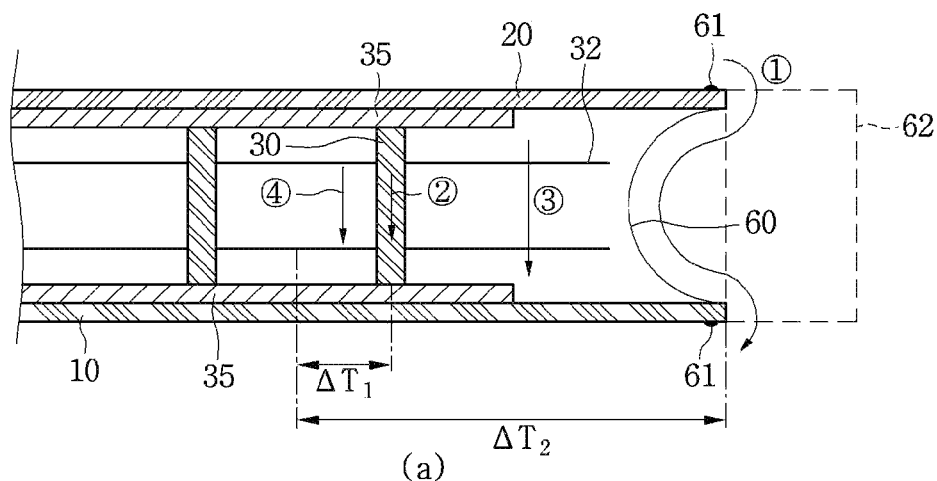
FIG. 4 is a view showing various embodiments of conductive resistance sheets and peripheral parts thereof.
Figure 4:
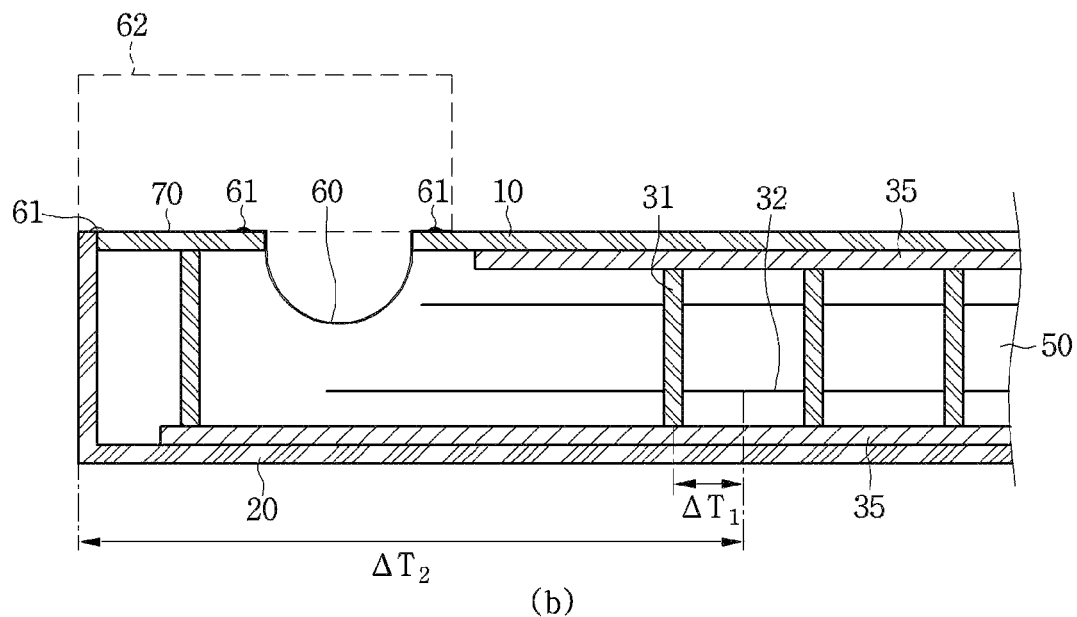
Figure 4:
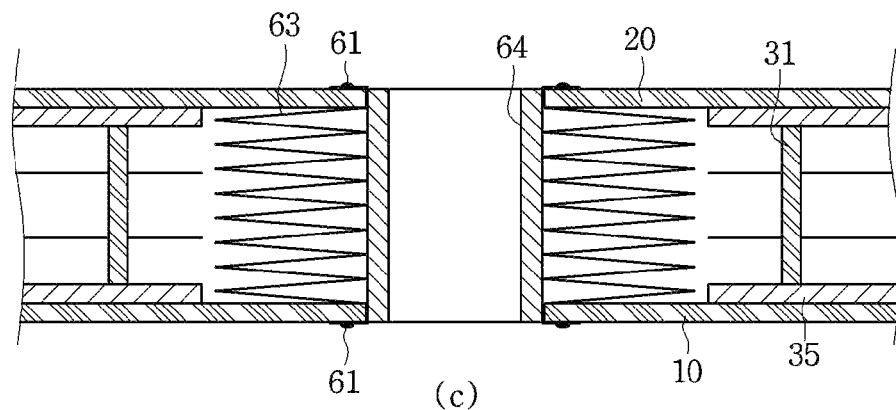

FIG. 4 is a view showing various embodiments of the conductive resistance sheets and peripheral parts thereof. Structures of the conductive resistance sheets are briefly illustrated in FIG. 2, but will be understood in detail with reference to FIG. 4.

First, a conductive resistance sheet proposed in FIG. 4a may be preferably applied to the main body-side vacuum adiabatic body. Specifically, the first and second plate members 10 and 20 are to be sealed so as to vacuum the interior of the vacuum adiabatic body. In this case, since the two plate members have different temperatures from each other, heat transfer may occur between the two plate members. A conductive resistance sheet 60 is provided to prevent heat conduction between two different kinds of plate members.

The conductive resistance sheet 60 may be provided with sealing parts 61 at which both ends of the conductive resistance sheet 60 are sealed to define at least one portion of the wall for the third space and maintain the vacuum state. The conductive resistance sheet 60 may be provided as a thin foil in units of micrometers so as to reduce the amount of heat conducted along the wall for the third space. The sealing parts 61 may be provided as welding parts. That is, the conductive resistance sheet 60 and the plate members 10 and 20 may be fused to each other. In order to cause a fusing action between the conductive resistance sheet 60 and the plate members 10 and 20, the conductive resistance sheet 60 and the plate members 10 and 20 may be made of the same material, and a stainless material may be used as the material. The sealing parts 61 are not limited to the welding parts, and may be provided through a process such as caulking. The conductive resistance sheet 60 may be provided in a curved shape. Thus, a heat conduction distance of the conductive resistance sheet 60 is provided longer than the linear distance of each plate member, so that the amount of heat conduction can be further reduced.

A change in temperature occurs along the conductive resistance sheet 60. Therefore, in order to block heat transfer to the exterior of the conductive resistance sheet 60, a shielding part or shield 62 may be provided at the exterior of the conductive resistance sheet 60 such that an adiabatic action occurs. In other words, in the refrigerator, the second plate member 20 has a high temperature and the first plate member 10 has a low temperature. In addition, heat conduction from high temperature to low temperature occurs in the conductive resistance sheet 60, and hence the temperature of the conductive resistance sheet 60 is suddenly changed. Therefore, when the conductive resistance sheet 60 is opened to the exterior thereof, heat transfer through the opened place may seriously occur. In order to reduce heat loss, the shielding part 62 is provided at the exterior of the conductive resistance sheet 60. For example, when the conductive resistance sheet 60 is exposed to any one of the low-temperature space and the high-temperature space, the conductive resistance sheet 60 does not serve as a conductive resistor as well as the exposed portion thereof, which is not preferable.

The shielding part 62 may be provided as a porous substance contacting an outer surface of the conductive resistance sheet 60. The shielding part 62 may be provided as an adiabatic structure, e.g., a separate gasket, which is placed at the exterior of the conductive resistance sheet 60. The shielding part 62 may be provided as a portion of the vacuum adiabatic body, which is provided at a position facing a corresponding conductive resistance sheet 60 when the main body-side vacuum adiabatic body is closed with respect to the door-side vacuum adiabatic body. In order to reduce heat loss even when the main body 2 and the door 3 are opened, the shielding part 62 may be preferably provided as a porous substance or a separate adiabatic structure.

A conductive resistance sheet proposed in FIG. 4b may be preferably applied to the door-side vacuum adiabatic body. In FIG. 4b, portions different from those of FIG. 4a are described in detail, and the same description is applied to portions identical to those of FIG. 4a. A side frame 70 is further provided at an outside of the conductive resistance sheet 60. A part for sealing between the door and the main body, an exhaust port necessary for an exhaust process, a getter port 41 for vacuum maintenance, and the like may be placed on the side frame 70. This is because the mounting of parts is convenient in the main body-side vacuum adiabatic body, but the mounting positions of parts are limited in the door-side vacuum adiabatic body.

In the door-side vacuum adiabatic body, it is difficult to place the conductive resistance sheet 60 at a front end portion of the vacuum space part, i.e., a corner side portion of the vacuum space part. This is because, unlike the main body, a corner edge portion of the door is exposed to the exterior. More specifically, if the conductive resistance sheet 60 is placed at the front end portion of the vacuum space part, the corner edge portion of the door is exposed to the exterior, and hence there is a disadvantage in that a separate adiabatic part should be configured so as to heat-insulate the conductive resistance sheet 60.

A conductive resistance sheet proposed in FIG. 4c may be preferably installed in the pipeline passing through the vacuum space part. In FIG. 4c, portions different from those of FIGS. 4a and 4b are described in detail, and the same description is applied to portions identical to those of FIGS. 4a and 4b. A conductive resistance sheet having the same shape as that of FIG. 4a, preferably, a wrinkled or folded conductive resistance sheet 63 may be provided at a peripheral portion of the pipeline 64. Accordingly, a heat transfer path can be lengthened, and deformation caused by a pressure difference can be prevented. In addition, a separate shielding part may be provided to improve the adiabatic performance of the conductive resistance sheet.

A heat transfer path between the first and second plate members 10 and 20 will be described with reference back to FIG. 4a. Heat passing through the vacuum adiabatic body may be divided into surface conduction heat ① conducted along a surface of the vacuum adiabatic body, more specifically, the conductive resistance sheet 60, supporter conduction heat ② conducted along the supporting unit 30 provided inside the vacuum adiabatic body, gas conduction heat ③ conducted through an internal gas in the vacuum space part, and radiation transfer heat ④ transferred through the vacuum space part.

The transfer heat may be changed depending on various design dimensions. For example, the supporting unit may be changed such that the first and second plate members 10 and 20 can endure a vacuum pressure without being deformed, the vacuum pressure may be changed, the distance between the plate members may be changed, and the length of the conductive resistance sheet may be changed. The transfer heat may be changed depending on a difference in temperature between the spaces (the first and second spaces) respectively provided by the plate members. In the embodiment, a preferred configuration of the vacuum adiabatic body has been found by considering that its total heat transfer amount is smaller than that of a typical adiabatic structure formed by foaming polyurethane. In a typical refrigerator including the adiabatic structure formed by foaming the polyurethane, an effective heat transfer coefficient may be proposed as 19.6 mW/mK.

By performing a relative analysis on heat transfer amounts of the vacuum adiabatic body of the embodiment, a heat transfer amount by the gas conduction heat ③ can become smallest. For example, the heat transfer amount by the gas conduction heat ③ may be controlled to be equal to or smaller than 4% of the total heat transfer amount. A heat transfer amount by solid conduction heat defined as a sum of the surface conduction heat ① and the supporter conduction heat ② is largest. For example, the heat transfer amount by the solid conduction heat may reach 75% of the total heat transfer amount. A heat transfer amount by the radiation transfer heat ④ is smaller than the heat transfer amount by the solid conduction heat but larger than the heat transfer amount of the gas conduction heat ③. For example, the heat transfer amount by the radiation transfer heat ④ may occupy about 20% of the total heat transfer amount.

According to such a heat transfer distribution, effective heat transfer coefficients (eK: effective K) (W/mK) of the surface conduction heat ①, the supporter conduction heat ②, the gas conduction heat ③, and the radiation transfer heat ④ may have an order of Math Figure 1.

$$eK_{solid\ conduction\ heat} > eK_{radiation\ transfer\ heat} > eK_{gas\ conduction\ heat} \quad [\text{Math.1}]$$

Here, the effective heat transfer coefficient (eK) is a value that can be measured using a shape and temperature differences of a target product. The effective heat transfer coefficient (eK) is a value that can be obtained by measuring a total heat transfer amount and a temperature at least one portion at which heat is transferred. For example, a calorific value (W) is measured using a heating source that can be quantitatively measured in the refrigerator, a temperature distribution (K) of the door is measured using heats respectively transferred through a main body and an edge of the door of the refrigerator, and a path through which heat is transferred is calculated as a conversion value (m), thereby evaluating an effective heat transfer coefficient.

The effective heat transfer coefficient (eK) of the entire vacuum adiabatic body is a value given by $k=QL/A\Delta T$. Here, Q denotes a calorific value (W) and may be obtained using a calorific value of a heater. A denotes a sectional area (m$^2$) of the vacuum adiabatic body, L denotes a thickness (m) of the vacuum adiabatic body, and $\Delta T$ denotes a temperature difference.

For the surface conduction heat, a conductive calorific value may be obtained through a temperature difference ($\Delta T$) between an entrance and an exit of the conductive resistance sheet 60 or 63, a sectional area (A) of the conductive resistance sheet, a length (L) of the conductive resistance sheet, and a thermal conductivity (k) of the conductive resistance sheet (the thermal conductivity of the conductive resistance sheet is a material property of a material and can be obtained in advance). For the supporter conduction heat, a conductive calorific value may be obtained through a temperature difference ($\Delta T$) between an entrance and an exit of the supporting unit 30, a sectional area (A) of the supporting unit, a length (L) of the supporting unit, and a thermal conductivity (k) of the supporting unit. Here, the thermal conductivity of the supporting unit is a material property of a material and can be obtained in advance. The sum of the gas conduction heat ③, and the radiation transfer heat ④ may be obtained by subtracting the surface conduction heat and the supporter conduction heat from the heat transfer amount of the entire vacuum adiabatic body. A ratio of the gas conduction heat ③, and the radiation transfer heat ④ may be obtained by evaluating radiation transfer heat when no gas conduction heat exists by remarkably lowering a vacuum degree of the vacuum space part 50.

When a porous substance is provided inside the vacuum space part 50, porous substance conduction heat ⑤ may be a sum of the supporter conduction heat ② and the radiation transfer heat ①. The porous substance conduction heat ⑤ may be changed depending on various variables including a kind, an amount, and the like of the porous substance.

According to an embodiment, a temperature difference $\Delta T_1$ between a geometric center formed by adjacent bars 31 and a point at which each of the bars 31 is located may be preferably provided to be less than 0.5° C. Also, a temperature difference $\Delta T_2$ between the geometric center formed by the adjacent bars 31 and an edge portion of the vacuum adiabatic body may be preferably provided to be less than 0.5° C. In the second plate member 20, a temperature difference between an average temperature of the second plate and a temperature at a point at which a heat transfer path passing through the conductive resistance sheet 60 or 63 meets the second plate may be largest. For example, when the second space is a region hotter than the first space, the temperature at the point at which the heat transfer path passing through the conductive resistance sheet meets the second plate member becomes lowest. Similarly, when the second space is a region colder than the first space, the temperature at the point at which the heat transfer path passing through the conductive resistance sheet meets the second plate member becomes highest.

This means that the amount of heat transferred through other points except the surface conduction heat passing through the conductive resistance sheet should be controlled, and the entire heat transfer amount satisfying the vacuum adiabatic body can be achieved only when the surface conduction heat occupies the largest heat transfer amount. To this end, a temperature variation of the conductive resistance sheet may be controlled to be larger than that of the plate member.

Physical characteristics of the parts constituting the vacuum adiabatic body will be described. In the vacuum adiabatic body, a force by vacuum pressure is applied to all of the parts. Therefore, a material having a strength ($N/m^2$) of a certain level may be preferably used.

Under such circumferences, the plate members 10 and 20 and the side frame 70 may be preferably made of a material having a sufficient strength with which they are not damaged by even vacuum pressure. For example, when the number of bars 31 is decreased so as to limit the support conduction heat, deformation of the plate member occurs due to the vacuum pressure, which may have a bad influence on the external appearance of refrigerator. The radiation resistance sheet 32 may be preferably made of a material that has a low emissivity and can be easily subjected to thin film processing. Also, the radiation resistance sheet 32 is to ensure a strength strong enough not to be deformed by an external impact. The supporting unit 30 is provided with a strength strong enough to support the force by the vacuum pressure and endure an external impact, and is to have machinability. The conductive resistance sheet 60 may be preferably made of a material that has a thin plate shape and can endure the vacuum pressure.

In an embodiment, the plate member, the side frame, and the conductive resistance sheet may be made of stainless materials having the same strength. The radiation resistance sheet may be made of aluminum having a weaker strength that the stainless materials. The supporting unit may be made of resin having a weaker strength than the aluminum.

Unlike the strength from the point of view of materials, analysis from the point of view of stiffness is required. The stiffness (N/m) is a property that would not be easily deformed. Although the same material is used, its stiffness may be changed depending on its shape. The conductive resistance sheets 60 or 63 may be made of a material having a strength, but the stiffness of the material is preferably low so as to increase heat resistance and minimize radiation heat as the conductive resistance sheet 60 or 63 is uniformly spread without any roughness when the vacuum pressure is applied. The radiation resistance sheet 32 requires a stiffness of a certain level so as not to contact another part due to deformation. Particularly, an edge portion of the radiation resistance sheet 32 may generate conduction heat due to drooping caused by the self-load of the radiation resistance sheet. Therefore, a stiffness of a certain level is required. The supporting unit 30 requires a stiffness to endure a compressive stress from the plate member and an external impact.

In an embodiment, the plate member and the side frame may preferably have the highest stiffness so as to prevent deformation caused by the vacuum pressure. The supporting unit, particularly, the bar may preferably have the second highest stiffness. The radiation resistance sheet may preferably have a stiffness that is lower than that of the supporting unit but higher than that of the conductive resistance sheet. The conductive resistance sheet may be preferably made of a material that is easily deformed by the vacuum pressure and has the lowest stiffness.

Even when the porous substance 33 is filled in the vacuum space part 50, the conductive resistance sheet may preferably have the lowest stiffness, and the plate member and the side frame may preferably have the highest stiffness.

Hereinafter, a vacuum pressure preferably determined depending on an internal state of the vacuum adiabatic body will be described. As already described above, a vacuum pressure is to be maintained inside the vacuum adiabatic body so as to reduce heat transfer. At this time, it will be easily expected that the vacuum pressure is preferably maintained as low as possible so as to reduce the heat transfer.

The vacuum space part may resist the heat transfer by applying only the supporting unit 30. Alternatively, the porous substance 33 may be filled together with the supporting unit in the vacuum space part 50 to resist the heat transfer. Alternatively, the vacuum space part may resist the heat transfer not by applying the supporting unit but by applying the porous substance 33.

The case where only the supporting unit is applied will be described.

Figure 5:
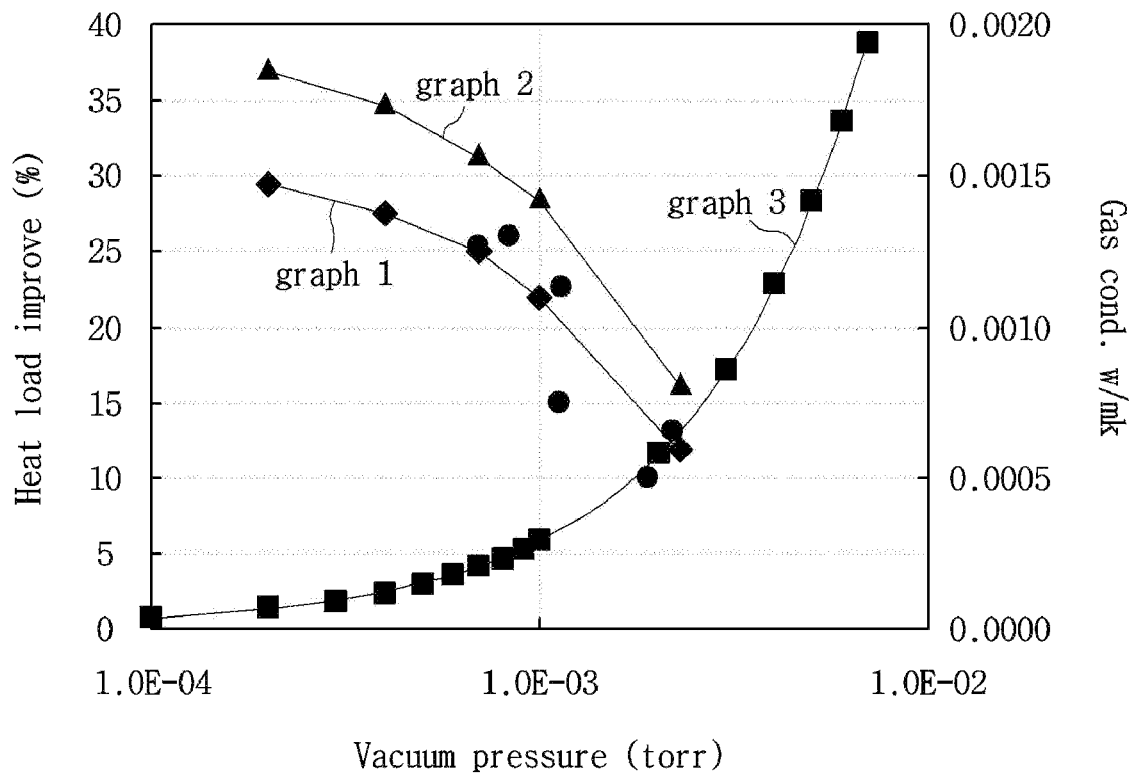
FIG. 5 illustrates graphs showing changes in adiabatic performance and changes in gas conductivity with respect to vacuum pressures by applying a simulation.

FIG. 5 illustrates graphs showing changes in adiabatic performance and changes in gas conductivity with respect to vacuum pressures by applying a simulation.

Referring to FIG. 5, it can be seen that, as the vacuum pressure is decreased, i.e., as the vacuum degree is increased, a heat load in the case of only the main body (Graph 1) or in the case where the main body and the door are joined together (Graph 2) is decreased as compared with that in the case of the typical product formed by foaming polyurethane, thereby improving the adiabatic performance. However, it can be seen that the degree of improvement of the adiabatic performance is gradually lowered. Also, it can be seen that, as the vacuum pressure is decreased, the gas conductivity (Graph 3) is decreased. However, it can be seen that, although the vacuum pressure is decreased, the ratio at which the adiabatic performance and the gas conductivity are improved is gradually lowered. Therefore, it is preferable that the vacuum pressure is decreased as low as possible. However, it takes long time to obtain excessive vacuum pressure, and much cost is consumed due to excessive use of a getter. In the embodiment, an optimal vacuum pressure is proposed from the above-described point of view.

Figure 6:
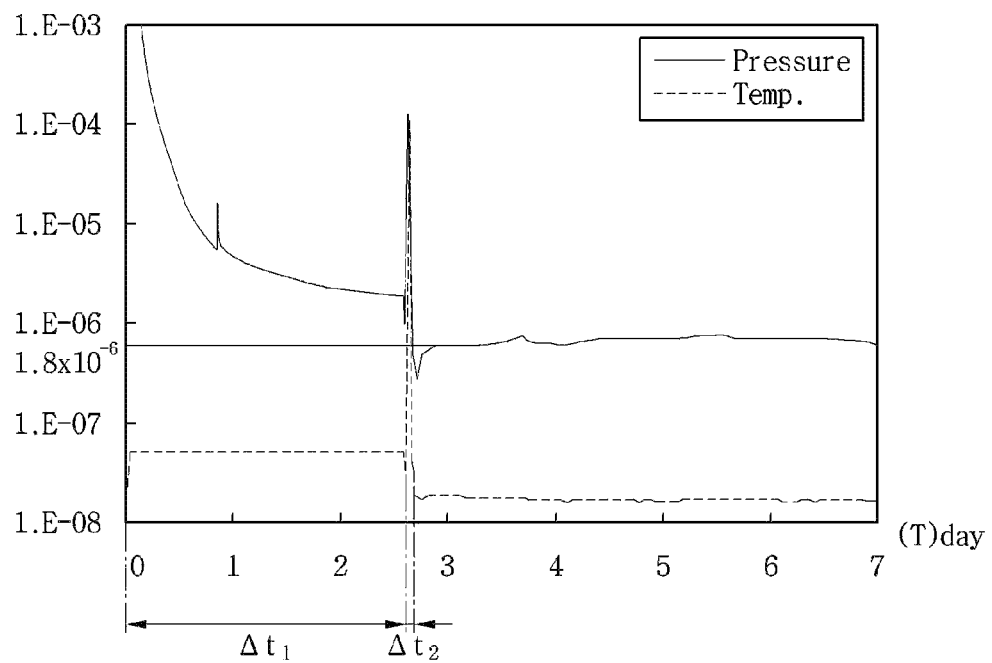
FIG. 6 illustrates graphs obtained by observing, over time and pressure, a process of exhausting the interior of the vacuum adiabatic body when a supporting unit is used.

FIG. 6 illustrates graphs obtained by observing, over time and pressure, a process of exhausting the interior of the vacuum adiabatic body when the supporting unit is used.

Referring to FIG. 6, in order to create the vacuum space part 50 to be in the vacuum state, a gas in the vacuum space part 50 is exhausted by a vacuum pump while evaporating a latent gas remaining in the parts of the vacuum space part 50 through baking. However, if the vacuum pressure reaches a certain level or more, there exists a point at which the level of the vacuum pressure is not increased any more (Δt1). After that, the getter is activated by disconnecting the vacuum space part 50 from the vacuum pump and applying heat to the vacuum space part 50 (Δt2). If the getter is activated, the pressure in the vacuum space part 50 is decreased for a certain period of time, but then normalized to maintain a vacuum pressure of a certain level. The vacuum pressure that maintains the certain level after the activation of the getter is approximately $1.8 \times 10^{-6}$ Torr.

In the embodiment, a point at which the vacuum pressure is not substantially decreased any more even though the gas is exhausted by operating the vacuum pump is set to the lowest limit of the vacuum pressure used in the vacuum adiabatic body, thereby setting the minimum internal pressure of the vacuum space part 50 to $1.8 \times 10^{-6}$ Torr.

Figure 7:
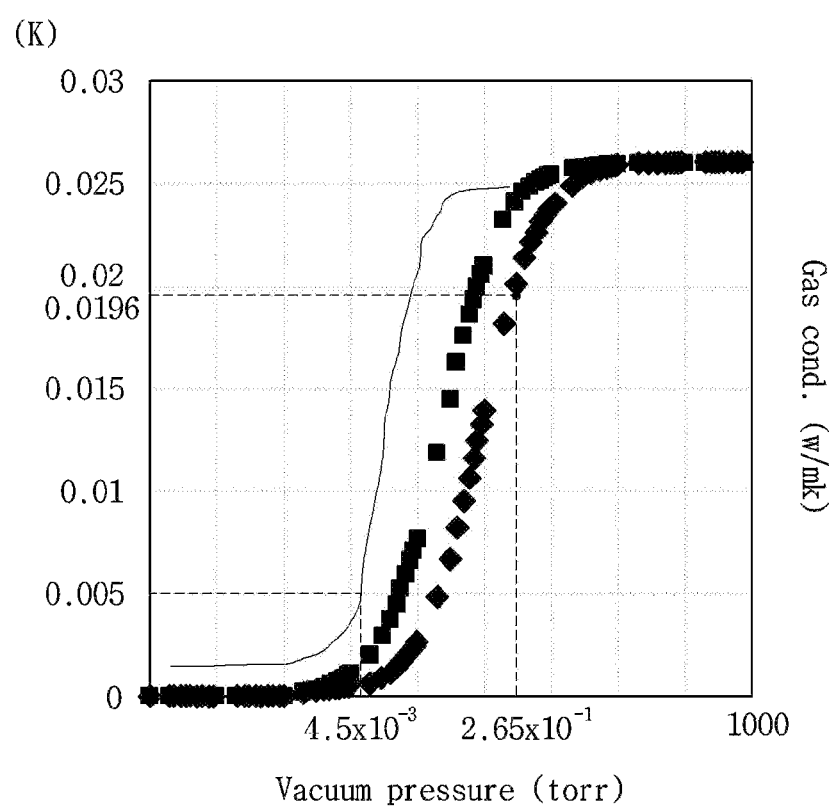
FIG. 7 illustrates graphs obtained by comparing vacuum pressures and gas conductivities.

FIG. 7 illustrates graphs obtained by comparing vacuum pressures and gas conductivities.

Referring to FIG. 7, gas conductivities with respect to vacuum pressures depending on sizes of a gap in the vacuum space part 50 are represented as graphs of effective heat transfer coefficients (eK). Effective heat transfer coefficients (eK) were measured when the gap in the vacuum space part 50 has three sizes of 2.76 mm, 6.5 mm, and 12.5 mm. The gap in the vacuum space part 50 is defined as follows. When the radiation resistance sheet 32 exists inside vacuum space part 50, the gap is a distance between the radiation resistance sheet 32 and the plate member adjacent thereto. When the radiation resistance sheet 32 does not exist inside vacuum space part 50, the gap is a distance between the first and second plate members.

It can be seen that, since the size of the gap is small at a point corresponding to a typical effective heat transfer coefficient of 0.0196 W/mK, which is provided to a adiabatic material formed by foaming polyurethane, the vacuum pressure is $2.65 \times 10^{-1}$ Torr even when the size of the gap is 2.76 mm. Meanwhile, it can be seen that the point at which reduction in adiabatic effect caused by gas conduction heat is saturated even though the vacuum pressure is decreased is a point at which the vacuum pressure is approximately $4.5 \times 10^{-3}$ Torr. The vacuum pressure of $4.5 \times 10^{-3}$ Torr can be defined as the point at which the reduction in adiabatic effect caused by gas conduction heat is saturated. Also, when the effective heat transfer coefficient is 0.1 W/mK, the vacuum pressure is $1.2 \times 10^{-2}$ Torr.

When the vacuum space part 50 is not provided with the supporting unit but provided with the porous substance, the size of the gap ranges from a few micrometers to a few hundreds of micrometers. In this case, the amount of radiation heat transfer is small due to the porous substance even when the vacuum pressure is relatively high, i.e., when the vacuum degree is low. Therefore, an appropriate vacuum pump is used to adjust the vacuum pressure. The vacuum pressure appropriate to the corresponding vacuum pump is approximately $2.0 \times 10^{-4}$ Torr. Also, the vacuum pressure at the point at which the reduction in adiabatic effect caused by gas conduction heat is saturated is approximately $4.7 \times 10^{-2}$ Torr. Also, the pressure where the reduction in adiabatic effect caused by gas conduction heat reaches the typical effective heat transfer coefficient of 0.0196 W/mK is 730 Torr.

When the supporting unit and the porous substance are provided together in the vacuum space part, a vacuum pressure may be created and used, which is between the vacuum pressure when only the supporting unit is used and the vacuum pressure when only the porous substance is used.

Hereinafter, the supporting unit 30 using the porous substance that has been proposed through FIG. 3c will be described in detail.

Figure 8:
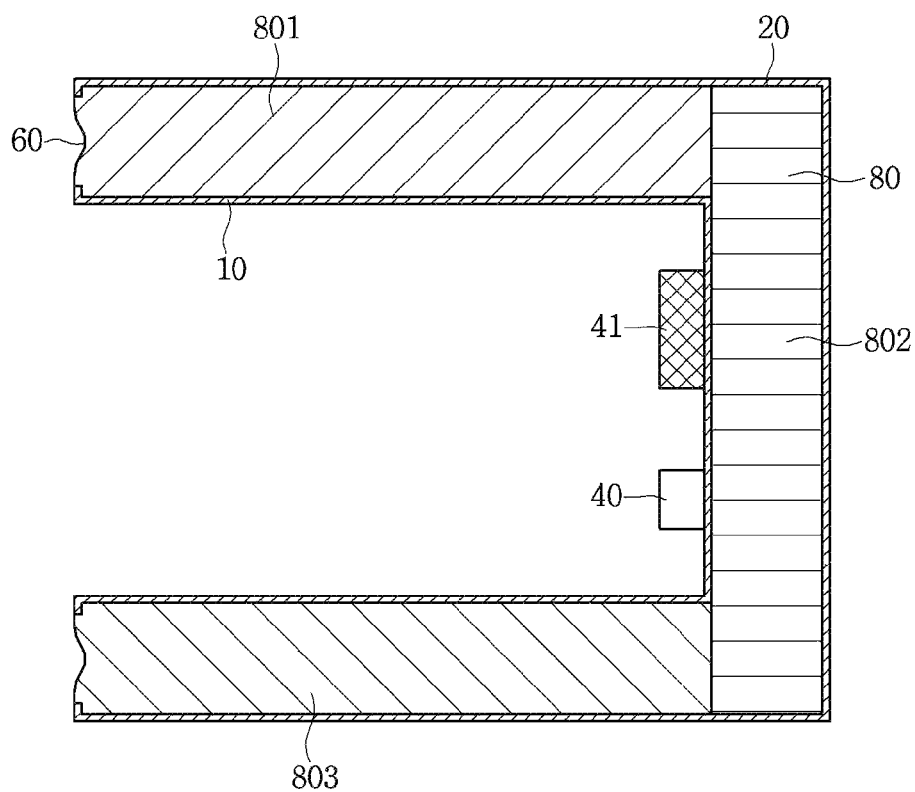
FIG. 8 is a sectional view of a vacuum adiabatic body according to an embodiment, which schematically shows the vacuum adiabatic body available for the main body of the refrigerator.

FIG. 8 is a sectional view of a vacuum adiabatic body according to an embodiment, which schematically shows the vacuum adiabatic body available for the main body of the refrigerator.

Referring to FIG. 8, a porous substance package 80 is inserted between a first plate member 10 and a second plate member 20. The porous substance package 80 includes first, second, and third porous substance packages 801, 802, and 803 respectively into both side portions and a rear portion. An exhaust port 40 and a getter port 41 are provided at one side of the first plate member 10. A conductive resistance sheet 60 is provided at a place at which the first plate member 10 and the second plate member 20 meet each other, to resist heat conduction between the plate members 10 and 20.

The porous substance package 80 may be provided in a form in which a porous substance is placed thereinside, and the outside of the porous substance package 80 is surrounded by a film. In a state in which the porous substance package 80 is inserted between the plate members 10 and 20, a predetermined hole may be provided in the film such that the inside and outside of the film communicate with each other.

The hole has not been provided since the porous substance package 80 was fabricated, and may be generated as the vacuum adiabatic body is fabricated by inserting the porous substance package 80 between the plate members 10 and 20. A material having a low outgassing rate may be preferably used as the film, to prevent degradation of vacuum degree, which may occur as the film is used. The film may be provided in a single layer. The hole is provided in a film that is minute in size and thin in thickness, and therefore, its illustration is omitted.

Figure 9:
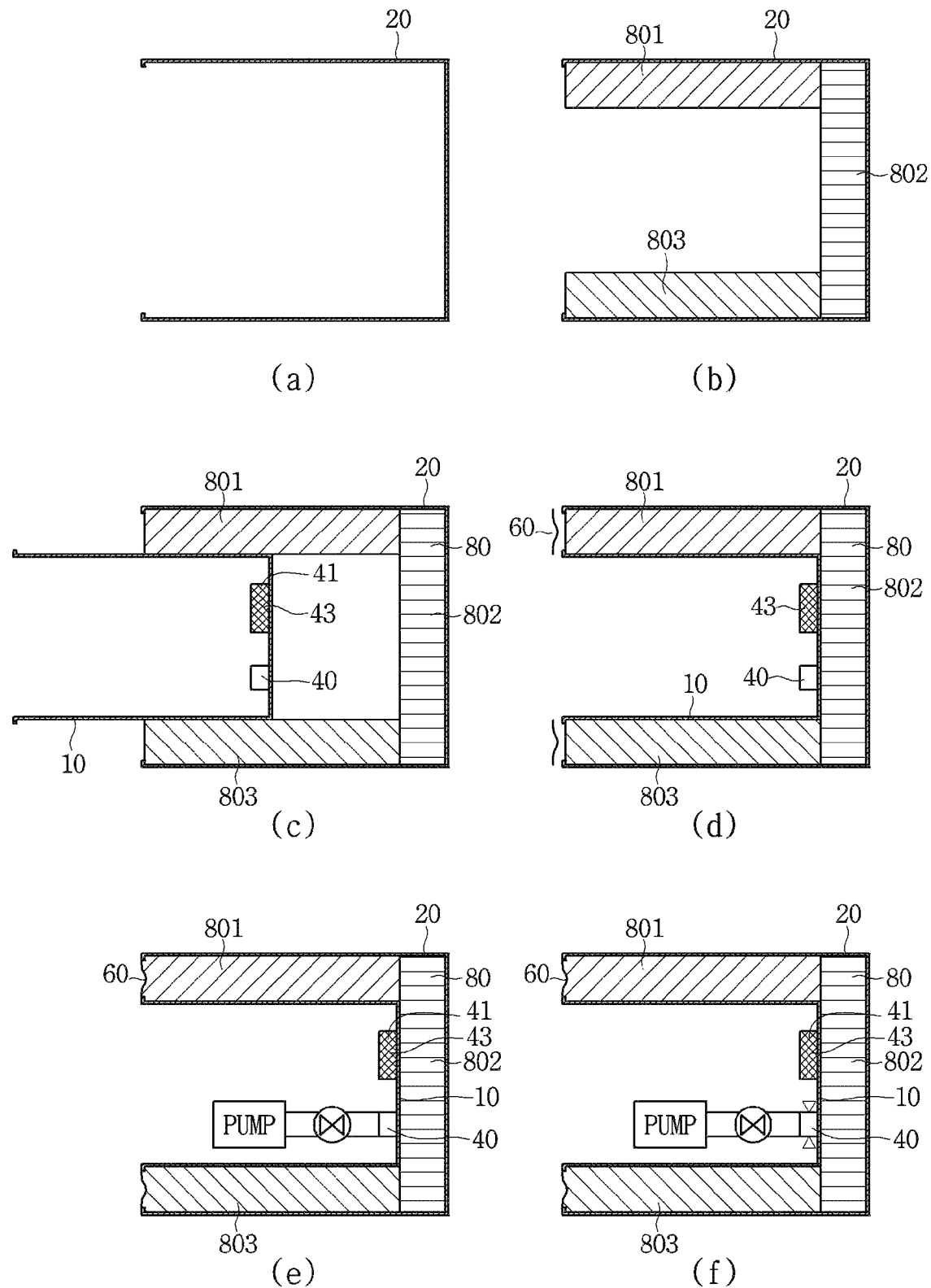
FIG. 9 is a view sequentially illustrating a fabrication method of the vacuum adiabatic body when a porous substance is used.

FIG. 9 is a view sequentially illustrating a fabrication method of the vacuum adiabatic body when a porous substance is used.

First, referring to FIG. 9a, the porous substance packages 801, 802, and 803 are disposed inside the second plate member 20. The porous substance package 80 may be provided in a panel shape, and therefore, three porous substance packages may be respectively placed at corners provided by the second plate member 20. When the vacuum adiabatic body is provided in the door, a single vacuum adiabatic body provided in a plate shape may be sufficiently used.

The inside of the porous substance package is provided to be in a vacuum state, which may be referred to as a temporarily vacuumed state, as compared with an additional vacuuming process which will be described later. The porous substance package 80 in this state may be referred to as a temporarily vacuumed porous substance package.

The temporary vacuum state may mean that pressure is lower than atmospheric pressure, i.e., that a vacuum degree is provided at a certain level. This is because a vacuum pressure of temporary vacuum required in the temporarily vacuumed porous substance package is sufficient as a pressure at which any additional deformation does not occur. In other words, the vacuum pressure of temporary vacuum may be provided as a pressure at which the fabrication efficiency of the porous substance package is improved, and there is no problem about deformation of the vacuum adiabatic body due to an additional decrease in volume when the porous substance package is mounted in the vacuum adiabatic body. That is, the vacuum pressure of temporary vacuum may be provided as a pressure lower than the atmospheric pressure. In this case, the vacuum pressure may be provided as a pressure higher than the pressure of the vacuum adiabatic body. Accordingly, it is possible to reduce the time required to fabricate the porous substance package 80.

Figure 10:
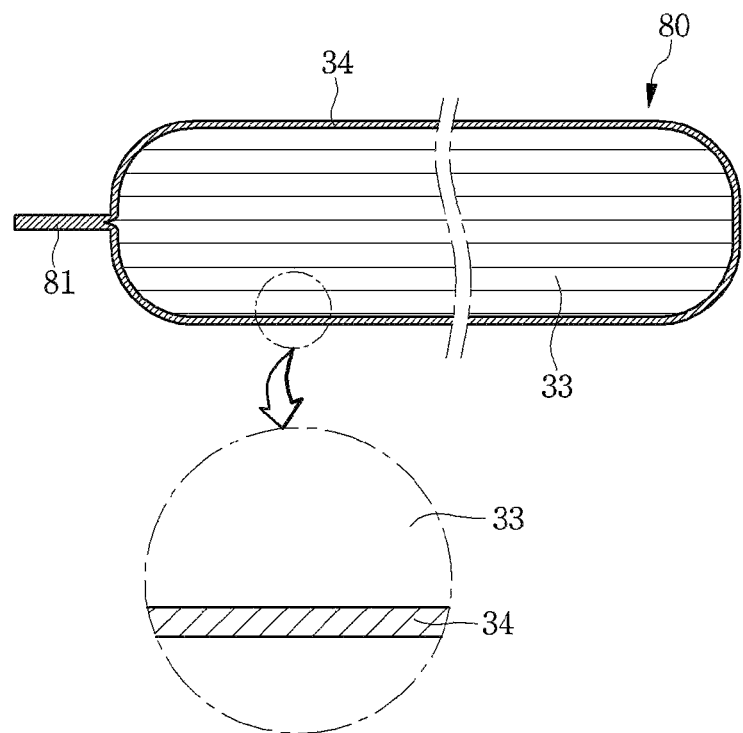
FIG. 10 is a sectional view of a porous substance package temporarily vacuumed before being mounted in the vacuum adiabatic body.

FIG. 10 is a sectional view of a porous substance package temporarily vacuumed before being mounted in the vacuum adiabatic body.

Referring to FIG. 10, the porous substance package 80 may be provided in the structure of a film 34 by which a porous substance 33 is accommodated. A fusion part or fused portion 81 is provided at end portions of the film 34, so that, after the porous material 33 is accommodated by the film 34 and then sealed, a large amount of matter is not introduced into the porous substance 33 from the outside of the film 34.

The porous substance 33 may include glass wool that has no outgassing and allows its density to be changed.

The inside of the porous substance package 80 is provided in the vacuum state, so that the porous substance package 80 can be easily mounted in a gap part or gap between the plate members 10 and 20. In addition, an additional deformation of the porous substance package 80 hardly occurs after the porous substance package 80 is mounted in the gap part. If the porous substance package 80 is placed in the gap part between the plate members 10 and 20 in a state that is not the vacuum state, the volume of the porous substance package 80 is increased, and therefore, fastening between the plate members 10 and 20 is difficult. In addition, as a vacuum space part 50 is contracted in creation of the vacuum state, deformation of the vacuum adiabatic body may occur, which is not preferable.

The film 34 may include thin-film PE that has a small amount of outgassing, easily provides a hole due to heat or impact, has excellent machinability, and is easily deformed. Since a hole is to be machined in a subsequent process, the film 34 may be provided as a thin film. When the film 34 is provided as a thin film, it is impossible to completely block introduction of gas and liquid from the outside. Therefore, after the porous substance package 80 is provided to be in the vacuum state, the porous substance package 80 is more preferably applied to the vacuum adiabatic body within a certain period of time.

In order to block gas and liquid, which pass through the film 34, the film 34 may be provided to have a predetermined thickness or more using a metal thin film such as aluminum or a specific resin. However, when the metal thin film is used, the adiabatic effect of the vacuum adiabatic body is rapidly decreased due to heat conduction through the metal thin film. Therefore, the metal thin film cannot be used in the vacuum adiabatic body of the embodiment. When the specific resin is used, cost is increased. When the film 34 is provided to having a predetermined thickness or more, it is difficult to provide a hole in a subsequent process, which is not preferable.

The film 34 may be provided to have a thickness of 1 to 100 μm by considering such conditions, such as temperature in a gettering process, and the like. This is because, if the thickness of the film 34 is extremely thick, it is difficult to provide a hole in the film 34 in a subsequent process, and, if the thickness of the film 34 is extremely thin, it is difficult to provide the fusion part 81.

Figure 11:
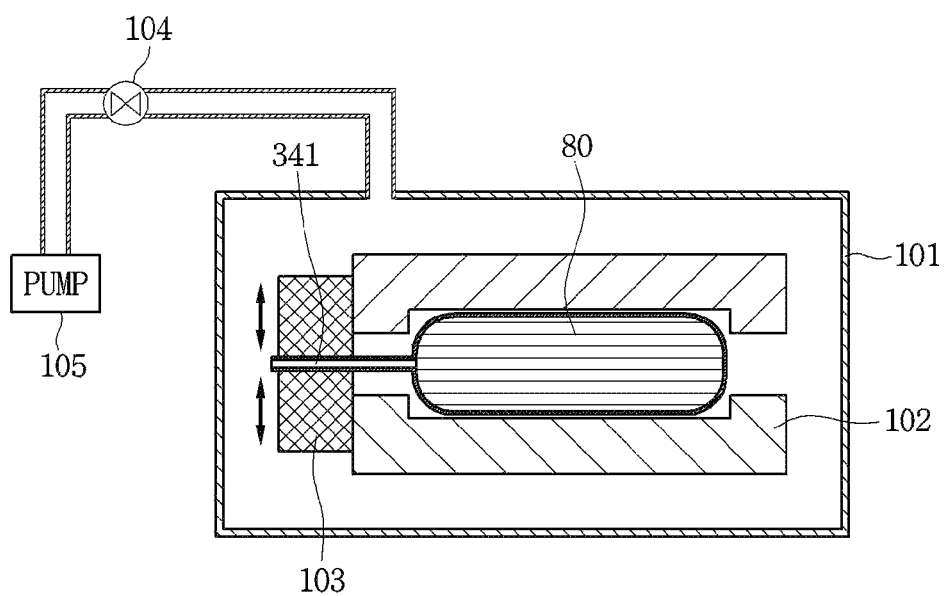
FIG. 11 is a view illustrating a fabrication apparatus of the porous substance package.

FIG. 11 is a view illustrating a fabrication apparatus of the porous substance package.

Referring to FIG. 11, a case 101 capable of providing a vacuum space is provided. The porous substance 33 is provided to a package frame 102 provided in the vacuum space of the case 101 in a state in which the porous substance 33 is accommodated by the film 34. In addition, a vacuum pressure is provided by operating a pump 105 and opening a valve 104. The package frame 102 may function to compress the porous substance 33. After the vacuum pressure of an internal space of the film 34 is provided at a certain level or less, the internal space of the film 34 is sealed by fusing an entry part 341 of the film 34, which is placed in the fusion frame 103.

Since the film 34 is provided as a thin film, an unfused portion may be generated when the entry part 341 is melted and fused to form the fusion part 81. In this case, the internal space of the film 34 may not be created to have the vacuum pressure. In order to solve this problem, another embodiment of the porous substance package will be described with reference to FIGS. 13 and 14.

Figure 13:
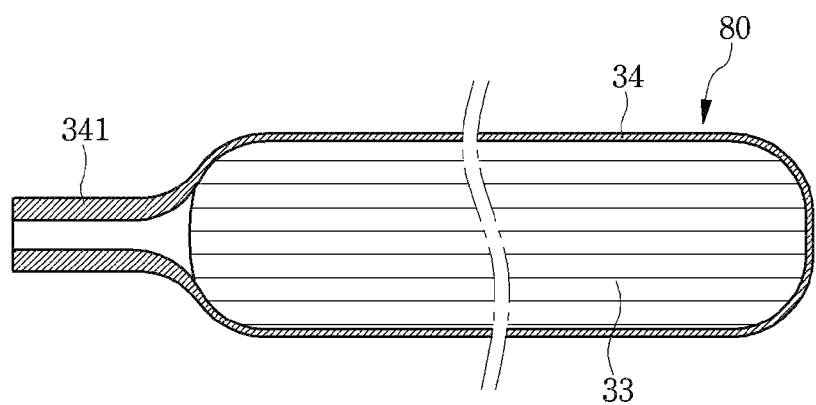
FIGS. 13 and 14 are view showing another embodiment of the porous substance package.
Figure 14:
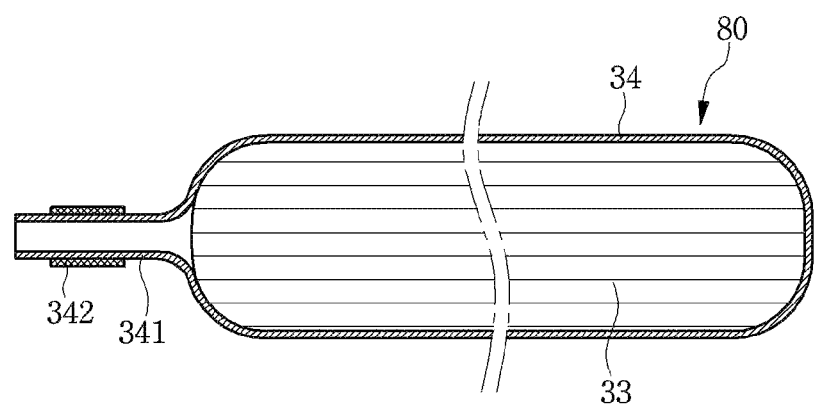

Referring to FIG. 13, the entry part 341 may be provided thicker than other portions. In this case, two portions of the entry part 341, which are opposite to each other, provide liquid resin when they are melted and fused, and hence can be completely fused to each other. Referring to FIG. 14, a metal thin film 342 may be provided to the entry part 341 at the outside of the film 34. In this case, the fusion part 81 can be completely provided by an action in which the metal thin film 342 supports the entry part 341.

Referring back to FIG. 9c, the first plate member 10 is put inside the porous substance package 80. The getter port 41 into which a getter 43 is inserted is provided to the first plate member 10, to further improve a vacuum environment inside the vacuum space part 50 through a subsequent activation process. In addition, the exhaust port 40 is further provided to the first plate member 10, to further improve a vacuum degree inside the vacuum space part 50 inside which the porous substance package 80 is accommodated.

Referring to FIG. 9d, a process of fastening the plate members 10 and 20 to each other may be performed. At this time, the conductive resistance sheet 60 is provided at a fastened portion to resist heat conduction between the plate members 10 and 20. The conductive resistance sheet 60 and the plate members 10 and 20 may be fastened to each other through welding. Here, the porous substance is filled in the vacuum space part 50, and hence the conductive resistance sheet 60 may be provided in a planar shape instead of the curved shape described in the aforementioned embodiment.

If the conductive resistance sheet 60 is fastened, the inside of the vacuum adiabatic body may be provided as a closed space separated from the exterior. After that, a process of providing the inside of the vacuum adiabatic body to be in the vacuum state is performed.

Referring to FIG. 9e, there is performed a process of exhausting air inside the vacuum adiabatic body by connecting a vacuum pump to the exhaust port 40. When the exhausting process is performed, heat is applied to the vacuum adiabatic body, so that it is possible to evaporate a liquid component that may remain inside the vacuum adiabatic body. In addition, it is possible to activate a gas inside the vacuum adiabatic, thereby further decreasing the vacuum pressure inside the vacuum adiabatic body. Meanwhile, as a melted portion may be generated in the film 34 of the porous substance package 80 by the applied heat in the exhausting process, a hole may be provided. A gas or liquid component existing in the temporarily vacuumed porous substance package 80 may be exhausted through the hole. In addition, after the temporarily vacuumed porous substance package 80 is fabricated, a gas or liquid component infiltrated by passing through the film 34 may also be exhausted through the hole. Through the hole provided in the film 34, the vacuum degree of the vacuum space part 50 can be entirely equalized without any difference between the interior and exterior.

Referring to FIG. 9F, as the operation of the vacuum pump is ended by closing a valve, the exhaust port 40 can be sealed. In addition, the getter 43 is activated, thereby further improving the vacuum degree of the vacuum space part 50.

Meanwhile, the process of punching the hole in the film 34 of the temporarily vacuumed porous substance package 80 is an important process for discharging a matter infiltrated into the porous substance package 80. This is required to consider the mobility of the temporarily vacuumed porous substance package and to improve productivity. Therefore, the hole is to be punched or punctured in the film 34 of the temporarily vacuumed porous substance package 80 while any one of the exhausting process and the gettering process is being performed. It will be apparent that the hole may be provided as the film 34 is melted by heat. However, a punching or puncture mechanism may be provided at any one side of the plate members 10 and 20 so as to provide against a case where the film is not punched even by heat and to accurately perform the process of punching the hole in the film. However, even when the hole is not provided, the function of the vacuum adiabatic body itself may be performed.

Figure 12:
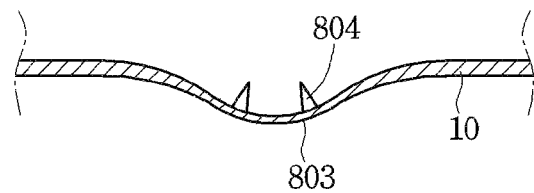
FIG. 12 is a view showing an embodiment of a punching mechanism.
Figure 12:
Figure 12:
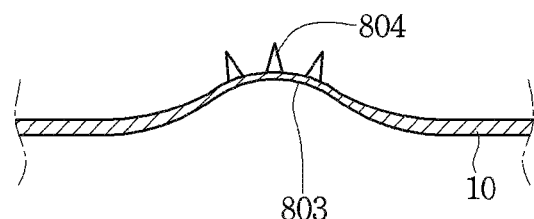

FIG. 12 is a view showing an embodiment of the punching mechanism.

The punching mechanism may include a deforming part 803 provided at a predetermined position of each of the plate members 10 and 20 and a pin 804 provided on an inner surface of the deforming part 803. The deforming part 803 may be provided in a shape protruding outward from each of the plate members 10 and 20. Therefore, when the deforming part 803 is introduced into the vacuum space part 50 by a force with which a pressure difference between the vacuum pressure and the atmospheric pressure is applied to the deforming part 803 as the vacuum pressure of the vacuum space part 50 is lowered, the pin 804 pierces the film 34, thereby providing the hole.

The deforming part 803 may be provided at any point of a portion at which each of the plate member 10 and 20 contacts the film 34. The deforming part 803 allows the thickness of each of the plate members 10 and 20 to be decreased by pressing the plate member. Thus, although the plate member is pressed by the force of the atmospheric pressure, deformation of the deforming part 803 can occur.

The vacuum adiabatic body on which the function of the supporting unit is performed can be provided as the vacuum space part is filled with the porous substance through the processes proposed in FIG. 9.

Meanwhile, the getter port 41 may be provided to each of the plate members 10 and 20 as described in the embodiment, but may be provided to the porous substance package 80. Specifically, when the getter port 41 is provided to each of the plate members 10 and 20, the getter is not in the vacuum state, and hence the volume of the getter 43 may be decreased as the exhaust process is performed. In this case, the volume of a portion at which the getter 43 is placed is changed as well as the volume of the getter 43, and therefore, there may occur a problem such as disagreement of dimensions of the vacuum adiabatic body. This may deepen a problem that deformation of each of the plate members 10 and 20 may slightly occur in the embodiment in which the temporarily vacuumed porous substance package is used.

In order to solve the problem of the deformation of the plate member, the getter may be previously provided inside the porous substance package, i.e., inside the film 34. In this case, an environment of vacuum pressure is created with respect to the getter during the process of temporarily vacuuming the porous substance package, thereby solving the problem of the deformation of the plate member. However, when the getter is located inside the porous substance package, the performance of the getter may be deteriorated due to gas and liquid, which may be infiltrated into the temporarily vacuumed porous substance package for a time required to have the temporarily vacuumed porous package to be built in the vacuum adiabatic body after the temporarily vacuumed porous package is fabricated. Therefore, the vacuum degree of the temporarily vacuumed porous package is to be further increased. In order to further decrease the vacuum degree of the temporarily vacuumed porous package, the time required to operate the vacuum pump is to be further increased, which results in inefficiency of fabrication processes and an increase in fabrication cost.

Under such circumferences, the getter may be provided to at least one or both of the plate member and the porous substance package depending on a use place or required performance of the vacuum adiabatic body.

If the porous substance is used for a supporting unit, it is possible to solve problems such as a problem of weight, which caused in the case of the supporting unit 30 including the bar 31, a problem of difficulty in designing the strength of the supporting unit, a problem of loss of heat passing through the bar, and a problem of failure of the entire supporting unit due to concentration of stress on another bar when any one bar is damaged.

As another embodiment, when only the porous substance is provided in the porous substance package, a support structure corresponding to the bar 31 may be additionally provided inside the porous substance package when it is likely that deformation of the plate member will seriously occur, thereby preventing the deformation of the plate member.

In the description of the present disclosure, a part for performing the same action in each embodiment of the vacuum adiabatic body may be applied to another embodiment by properly changing the shape or dimension of the other embodiment. Accordingly, still another embodiment can be easily proposed. For example, in the detailed description, in the case of a vacuum adiabatic body suitable as a door-side vacuum adiabatic body, the vacuum adiabatic body may be applied as a main body-side vacuum adiabatic body by properly changing the shape and configuration of a vacuum adiabatic body.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The vacuum adiabatic body proposed in the present disclosure may be preferably applied to refrigerators. However, the application of the vacuum adiabatic body is not limited to the refrigerators, and may be applied in various apparatuses such as cryogenic refrigerating apparatuses, heating apparatuses, and ventilation apparatuses.

According to the present disclosure, the vacuum adiabatic body can be industrially applied to various adiabatic apparatuses. The adiabatic effect can be enhanced, so that it is possible to improve energy use efficiency and to increase the effective volume of an apparatus.

However, it is difficult to obtain an adiabatic effect of a practical level by providing the walls of the refrigerator to be in a sufficient vacuum state. Specifically, it is difficult to prevent heat transfer at a contact portion between external and internal cases having different temperatures.

Further, it is difficult to maintain a stable vacuum state. Furthermore, it is difficult to prevent deformation of the cases due to a sound pressure in the vacuum state. Due to these problems, the technique of Reference Document 3 is limited to cryogenic refrigerating apparatuses, and is not applied to refrigerating apparatuses used in general households.

Embodiments provide a vacuum adiabatic body, a fabrication method for the vacuum adiabatic body, a porous substance package, and a refrigerator, which can obtain a sufficient adiabatic effect in a vacuum state and be applied commercially.

In one embodiment, a vacuum adiabatic body includes: a first plate member or first plate defining at least one portion of a wall for a first space; a second plate member or second plate defining at least one portion of a wall for a second space having a different temperature from the first space; a sealing part or seal sealing the first plate member and the second plate member to provide a third space that has a temperature between the temperature of the first space and the temperature of the second space and is in a vacuum state; a supporting unit or support maintaining the third space; a heat resistance unit or device for decreasing a heat transfer amount between the first plate member and the second plate member; and an exhaust port through which a gas in the third space is exhausted, wherein the supporting unit includes: a porous substance; and a film made of a resin material, the film accommodating the porous substance thereby.

The supporting unit may be provided only with the porous substance and the film made of the resin material. The film made of the resin material may be provided in a single layer. At least one hole may be provided in the film. A thickness of the film may be 1 to 100 μm. The vacuum adiabatic body may further include a punching mechanism for punching the film.

In another embodiment, a porous substance package includes: a porous substance; and a film providing a space in which the porous substance is accommodated by separating the porous substance from an outside thereof, wherein the porous substance package allows an external gas or liquid to be introduced into the porous substance by passing through the film.

The film may be provided in a single layer. The porous substance package may include a fusion part or fused portion provided by fusing an entry part through which the porous substance is accommodated by the film. The fusion part may be provided thicker than other portions, or a metal thin film may be provided to the fusion part. The porous substance package may include a getter provided thereinside.

In still another embodiment, a fabrication method for a vacuum adiabatic body includes: accommodating a porous substance package in a vacuum state in an internal space of an environment closed from the exterior; exhausting air in the internal space; and exploding or releasing the porous substance package such that the entire pressure of the internal space is equalized.

The porous substance package may include a porous substance and a film accommodating the porous substance thereby. In the exhausting of the air, heat may be applied, and the film may be melted by the heat, thereby exploding the porous substance package.

A punching mechanism for exploding the porous substance package may be further provided.

In still another embodiment, a refrigerator includes: a main body provided with an internal space in which storage goods are stored; and a door provided to open/close the main body from an external space, wherein, in order to supply a refrigerant into the main body, the refrigerator includes: a compressor for compressing the refrigerant; a condenser for condensing the compressed refrigerant; an expander for expanding the condensed refrigerant; and an evaporator for evaporating the expanded refrigerant to take heat, wherein at least one of the main body and the door includes a vacuum adiabatic body, wherein the vacuum adiabatic body includes: a first plate member or first plate defining at least one portion of a wall for the internal space; a second plate member or second plate defining at least one portion of a wall for the external space; a sealing part or seal sealing the first plate member and the second plate member to provide a vacuum space part or vacuum space that has a temperature between a temperature of the internal space and a temperature of the external space and is in a vacuum state; a supporting unit or support maintaining the vacuum space part; a heat resistance unit or device for decreasing a heat transfer amount between the first plate member and the second plate member; and an exhaust port through which a gas in the vacuum space part is exhausted, wherein the vacuum space part is provided with a porous substance package including a porous substance and a punched film accommodating the porous substance thereby.

The porous substance may be provided in supporting unit. The film may be made of PE, and the porous material may be made of glass wool. When the vacuum adiabatic body is provided in the main body, the porous substance package may be provided in at least three. A bar may be provided in the porous substance package. The film may be provided in a single layer. The refrigerator may include a pin protruding to an inside of the vacuum space part.

According to the present disclosure, it is possible to obtain a sufficient and stable vacuum adiabatic effect. According to the present disclosure, it is possible to perform heat insulation on the vacuum space part. According to the present disclosure, it is possible to provide a vacuum adiabatic body applicable to apparatuses such as refrigerators at low cost through a simple process.

The details of one or more embodiments are set forth in the accompanying drawings and the description below. Other features will be apparent from the description and drawings, and from the claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A vacuum adiabatic body comprising:
a first plate to have a first temperature;
a second plate to have a second temperature different from the first temperature;
a seal configured to seal the first plate and the second plate, and to provide a space that has a third temperature, the space to be provided into a vacuum state;

a porous substance to be disposed within the space;
a film configured to accommodate the porous substance; and
an exhaust port configured to exhaust air from within the space,
wherein the air exhausted through the exhaust port includes air inside of the film.

2. The vacuum adiabatic body of claim 1, wherein the porous substance has a higher emissivity than material of the first and second plates.

3. The vacuum adiabatic body of claim 1, wherein the porous substance is provided in a state surrounded by the film.

4. The vacuum adiabatic body of claim 1, comprising a support that supports the first and second plates and is provided in the space.

5. The vacuum adiabatic body of claim 1, wherein the film is provided in a single layer.

6. The vacuum adiabatic body of claim 1, wherein the film is made of a resin material such that the porous substance does not pass through the resin material and an external gas or liquid passes through the resin material.

7. The vacuum adiabatic body of claim 1, wherein at least one hole is provided in the film such that the porous substance passes through the at least one hole.

8. The vacuum adiabatic body of claim 1, wherein the film has a thickness of 1 to 100 μm.

9. The vacuum adiabatic body of claim 1, comprising a punching mechanism for puncturing the film.

10. A refrigerator comprising:
a main body having an internal space to store goods; and
a door configured to open and close the main body from an external space,
wherein, in order to supply a refrigerant into the main body, the refrigerator comprises:
a compressor that compresses the refrigerant;
a condenser that condenses the compressed refrigerant;
an expander that expands the condensed refrigerant; and
an evaporator that evaporates the expanded refrigerant,
wherein at least one of the main body and the door comprises the vacuum adiabatic body of claim 1.

11. A vacuum adiabatic body comprising:
a first plate to have a first temperature;
a second plate to have a second temperature different from the first temperature;
a seal configured to seal the first plate and the second plate, and to provide a space that has a third temperature, the space to be provided into a vacuum state;
an exhaust port configured to exhaust an air from within the space; and
a porous substance package to be provided within the space, the porous substance package comprising a porous substance and a punctured film configured to accommodate the porous substance therein.

12. A refrigerator comprising:
a main body having an internal space to store goods; and
a door configured to open and close the main body from an external space,
wherein, in order to supply a refrigerant into the main body, the refrigerator comprises:
a compressor that compresses the refrigerant;
a condenser that condenses the compressed refrigerant;
an expander that expands the condensed refrigerant; and
an evaporator that evaporates the expanded refrigerant,
wherein at least one of the main body and the door comprises the vacuum adiabatic body of claim 11.

13. The vacuum adiabatic body of claim 11, wherein the punctured film includes a hole to communicate between inside and outside of the film.

14. The vacuum adiabatic body of claim 11, wherein the film is provided in a single layer.

15. The vacuum adiabatic body of claim 11, wherein the porous substance includes glass wool.

16. The vacuum adiabatic body of claim 11, wherein the film has a thickness of 1 to 100 μm.

17. The vacuum adiabatic body of claim 11, comprising a punching mechanism for puncturing the film.

18. A vacuum adiabatic body comprising:
a first plate to have a first temperature;
a second plate to have a second temperature different from the first temperature;
a seal configured to seal the first plate and the second plate, and to provide a space that has a third temperature, and the space is to be provided within a vacuum state;
a porous substance to be disposed inside of the space;
a film configured to accommodate the porous substance therein; and
an exhaust port configured to exhaust air from within the space,
wherein based on the exhaust port exhausting the air, the film is to melt by heat or the film is punched, thereby releasing the porous substance into the space.

19. The vacuum adiabatic body of claim 18, wherein the exhaust port is provided at the first plate.

20. The vacuum adiabatic body of claim 18, comprising a getter port provided at the first plate.

* * * * *